US012331653B2

(12) United States Patent
Okamoto et al.

(10) Patent No.: US 12,331,653 B2
(45) Date of Patent: Jun. 17, 2025

(54) GAS TURBINE STATIONARY BLADE AND GAS TURBINE

(71) Applicant: MITSUBISHI HEAVY INDUSTRIES, LTD., Tokyo (JP)

(72) Inventors: Takuya Okamoto, Kanagawa (JP); Tomoko Morikawa, Kanagawa (JP); Satoshi Hada, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/036,058

(22) PCT Filed: Oct. 15, 2021

(86) PCT No.: PCT/JP2021/038213
§ 371 (c)(1),
(2) Date: May 9, 2023

(87) PCT Pub. No.: WO2022/163030
PCT Pub. Date: Aug. 4, 2022

(65) Prior Publication Data
US 2023/0407752 A1    Dec. 21, 2023

(30) Foreign Application Priority Data

Feb. 1, 2021  (JP) .................... 2021-014274

(51) Int. Cl.
*F01D 9/04*     (2006.01)
*F01D 5/18*     (2006.01)
*F02C 7/18*     (2006.01)

(52) U.S. Cl.
CPC .............. *F01D 5/18* (2013.01); *F01D 5/185* (2013.01); *F01D 5/187* (2013.01); *F01D 9/041* (2013.01);
(Continued)

(58) Field of Classification Search
None
See application file for complete search history.

(56) References Cited

U.S. PATENT DOCUMENTS

| | | | | |
|---|---|---|---|---|
| 4,693,667 | A | * | 9/1987 | Lenz ....................... F01D 5/189 415/115 |
| 5,344,283 | A | * | 9/1994 | Magowan ............... F01D 9/041 416/193 A |

(Continued)

FOREIGN PATENT DOCUMENTS

| | | | | |
|---|---|---|---|---|
| JP | 8-74508 | | 3/1996 | |
| JP | H0874508 | A * | 3/1996 | ............... F01D 9/02 |

(Continued)

OTHER PUBLICATIONS

International Search Report issued Jan. 11, 2022 in International Application No. PCT/JP2021/038213, with English translation of Search Report.

(Continued)

*Primary Examiner* — Lorne E Meade
*Assistant Examiner* — Marc Amar
(74) *Attorney, Agent, or Firm* — Wenderoth, Lind & Ponack, L.L.P.

(57) ABSTRACT

A turbine stationary blade is a turbine stationary blade that includes: a blade body; and a shroud formed in an end portion of the blade body in a blade height direction. The shroud includes: a bottom plate in contact with a combustion gas flow passage; a peripheral wall formed in the blade height direction and along a peripheral edge of the bottom plate; a recess forming a space surrounded by the peripheral wall and the bottom plate; a plurality of partition ribs connecting the blade body and the peripheral wall, dividing the recess into a plurality of spaces, and forming a plurality (Continued)

of cavities; and an impingement plate dividing the space into an outer cavity formed on an outer side in the blade height direction and an inner cavity formed on an inner side of the outer cavity, and having a plurality of through holes via which the outer cavity and the inner cavity communicate with each other. The peripheral wall includes: a leading edge end portion extending to a leading edge side of the blade body; a suction side end portion extending from a leading edge to a trailing edge on a suction side of the blade body, and internally including a suction side passage; a pressure side end portion extending from a leading edge to a trailing edge on a pressure side of the blade body, and internally including a pressure side passage; and a trailing edge end portion extending to a trailing edge side of the blade body. The plurality of cavities are formed from the inner cavity, and include: a first cavity disposed on a leading edge pressure side so as to surround a circumference of the blade body between the blade body and the peripheral wall, connected to the cooling hole formed in the bottom plate, and connected to the pressure side passage; and a second cavity disposed adjacent to an axially downstream side of the first cavity, disposed on a most axially upstream side of the pressure side among the partition ribs, disposed via a first partition rib connecting the pressure side end portion and the pressure surface of the blade body, and having a plurality of cooling holes in the bottom plate. An opening density of the through holes of the impingement plate in the second cavity is lower than the opening density of the through holes of the impingement plate in the first cavity.

14 Claims, 10 Drawing Sheets

(52) U.S. Cl.
CPC ............... *F01D 9/047* (2013.01); *F02C 7/18* (2013.01); *F05D 2260/201* (2013.01)

(56) References Cited

U.S. PATENT DOCUMENTS

| 5,609,466 | A | * | 3/1997 | North | F01D 5/187 |
| | | | | | 415/115 |
| 8,777,570 | B1 | * | 7/2014 | Liang | F01D 5/187 |
| | | | | | 416/193 A |
| 9,638,047 | B1 | * | 5/2017 | Jones | F01D 9/041 |
| 2007/0160475 | A1 | * | 7/2007 | Rogers | F01D 5/188 |
| | | | | | 416/96 R |
| 2010/0047056 | A1 | | 2/2010 | Lee et al. | |
| 2010/0150734 | A1 | * | 6/2010 | Hada | F01D 5/188 |
| | | | | | 416/97 R |
| 2015/0152736 | A1 | * | 6/2015 | Liang | F01D 5/186 |
| | | | | | 415/115 |
| 2015/0159494 | A1 | * | 6/2015 | Carrier | F01D 9/02 |
| | | | | | 29/889.22 |
| 2018/0045060 | A1 | | 2/2018 | Matsuo et al. | |
| 2018/0230836 | A1 | * | 8/2018 | Tibbott | F01D 25/12 |
| 2018/0347369 | A1 | * | 12/2018 | Sakaguchi | F01D 5/187 |
| 2022/0003124 | A1 | * | 1/2022 | Atsumi | F01D 9/02 |
| 2023/0340882 | A1 | * | 10/2023 | Matsuo | F01D 9/041 |

FOREIGN PATENT DOCUMENTS

| JP | 2009-162228 | | 7/2009 | |
| JP | 2009-299601 | | 12/2009 | |
| JP | 2012-202335 | | 10/2012 | |
| JP | 2015-105655 | | 6/2015 | |
| JP | 2020-63719 | | 4/2020 | |
| JP | 6799702 | | 12/2020 | |
| JP | 6799702 B1 | * | 12/2020 | ............ F01D 25/24 |
| WO | 2009/017015 | | 2/2009 | |
| WO | 2016/152573 | | 9/2016 | |

OTHER PUBLICATIONS

International Preliminary Report on Patentability issued Aug. 10, 2023 in International Application No. PCT/JP2021/038213, with English translation.

* cited by examiner

Detailed B section

Detailed C section

D-D cross section

E-E cross section

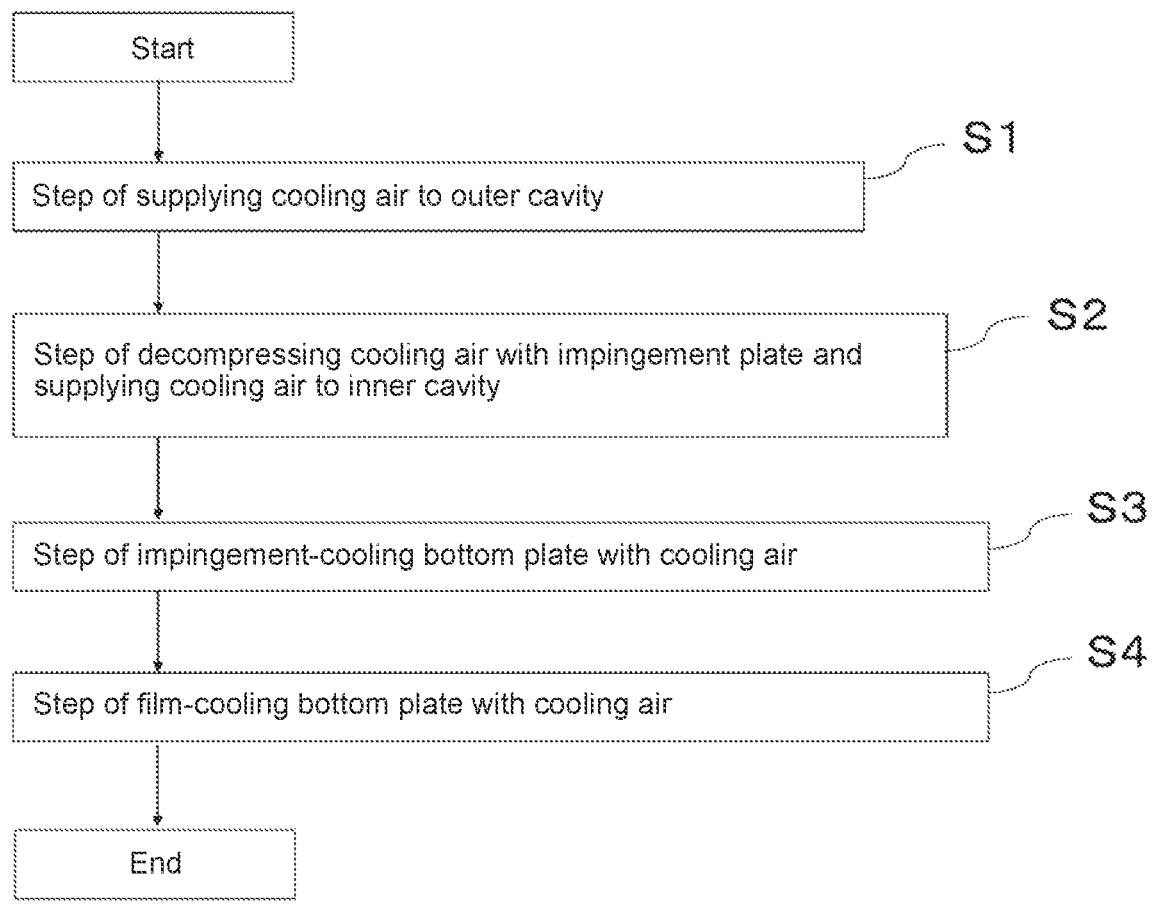

GAS TURBINE STATIONARY BLADE AND GAS TURBINE

TECHNICAL FIELD

The present disclosure relates to a gas turbine stationary blade and a gas turbine.

This application claims the priority of Japanese Patent Application No. 2021-014274 filed on Feb. 1, 2021, the content of which is incorporated herein by reference.

BACKGROUND

A gas turbine stationary blade is exposed to a combustion gas, and is thus cooled by cooling air.

For example, a gas turbine stationary blade disclosed in Patent Document 1 describes a structure for cooling a blade body and a shroud, and discloses a structure for dividing the shroud into a plurality of cavities by a plurality of ribs and cooling each cavity.

CITATION LIST

Patent Literature

Patent Document 1: WO2009/017015A

SUMMARY

Technical Problem

However, the cooling structure disclosed in Patent Document 1 is mainly the cooling structure for the blade body, and Patent Document 1 does not disclose the cooling structure including the blade body and the shroud.

An object of the present disclosure is to provide a gas turbine stationary blade in which the shroud is divided into the plurality of cavities to form a multi-cavity (a collection of cavities consisting of the plurality of cavities) and the cooling structure for each cavity is to be optimized.

Solution to Problem

At least one embodiment according to the present disclosure is a turbine stationary blade including: a blade body; and a shroud formed in an end portion of the blade body in a blade height direction. The shroud includes: a bottom plate in contact with a combustion gas flow passage; a peripheral wall formed in the blade height direction and along a peripheral edge of the bottom plate; a recess forming a space surrounded by the peripheral wall and the bottom plate; a plurality of partition ribs connecting the blade body and the peripheral wall, dividing the recess into a plurality of spaces, and forming a plurality of cavities; and an impingement plate dividing the space into an outer cavity formed on an outer side in the blade height direction and an inner cavity formed on an inner side of the outer cavity, and having a plurality of through holes via which the outer cavity and the inner cavity communicate with each other. The peripheral wall includes: a leading edge end portion extending to a leading edge side of the blade body; a suction side end portion extending from a leading edge to a trailing edge on a suction side of the blade body, and internally including a suction side passage; a pressure side end portion extending from a leading edge to a trailing edge on a pressure side of the blade body, and internally including a pressure side passage; and a trailing edge end portion extending to a trailing edge side of the blade body. The plurality of cavities are formed from the inner cavity, and include: a first cavity disposed on a leading edge pressure side so as to surround a circumference of the blade body between the blade body and the peripheral wall, connected to the cooling hole formed in the bottom plate, and connected to the pressure side passage; and a second cavity disposed adjacent to an axially downstream side of the first cavity, disposed on a most axially upstream side of the pressure side among the partition ribs, disposed via a first partition rib connecting the pressure side end portion and the pressure surface of the blade body, and having a plurality of cooling holes in the bottom plate. The cooling holes of the first cavity and the second cavity form a plurality of cooling hole rows consisting of a plurality of the cooling holes whose first ends are connected to inlet openings formed in the bottom plate and second ends are connected to outlet openings formed in a gas path surface of the bottom plate. The cooling hole rows include an opening center line which consists of a linear first opening center line connecting the outlet openings of the cooling holes, and a linear second opening center line disposed in parallel to the first opening center line and connecting the inlet openings of the cooling holes. The first opening center line is disposed in parallel to the first partition rib. An opening density of the impingement plate in the second cavity is at least lower than the opening density of the impingement plate in the first cavity.

Advantageous Effects

According to at least one embodiment of the present disclosure, an appropriate cooling structure for a shroud composed of a multi-cavity is formed, a cooling air amount is reduced, and efficiency of a gas turbine is improved.

BRIEF DESCRIPTION OF DRAWINGS

FIG. 10 is a flowchart showing a cooling method for the turbine stationary blade.

DETAILED DESCRIPTION

Hereinafter, embodiments of the present disclosure will be described with reference to the accompanying drawings.

<<Configuration of Gas Turbine>>

Figure 1:
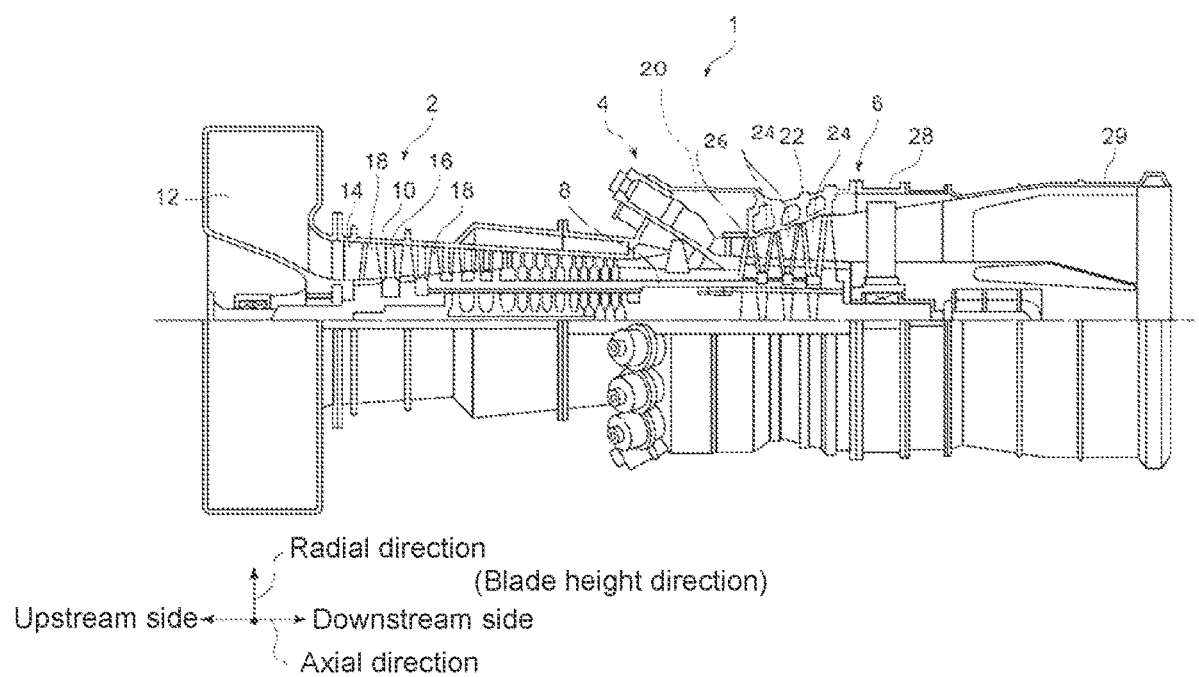
FIG. 1 is a schematic configuration view of a gas turbine according to an embodiment of the present disclosure.

A gas turbine to which a turbine stationary blade is applied will be described with reference to FIG. 1. FIG. 1 is a schematic configuration view of a gas turbine 1 according to an embodiment to which a turbine stationary blade 24 is applied.

As shown in FIG. 1, the gas turbine 1 according to an embodiment includes a compressor 2 for generating compressed air, a combustor 4 for generating a combustion gas G with the compressed air and fuel, and a turbine 6 rotationally driven by the combustion gas G. In the case of the gas turbine 1 for power generation, a generator (not shown) is connected to the turbine 6, so that rotational energy of the turbine 6 generates power.

Each configuration in the gas turbine 1 will be described with reference to FIG. 1.

The compressor 2 includes a compressor casing 10, an intake chamber 12 disposed on an inlet side of the compressor casing 10 and configured to suck in air, a rotor 8 disposed so as to penetrate both of the compressor casing 10 and a turbine casing 22 described later, and a variety of blades disposed in the compressor casing 10. The variety of blades includes an inlet guide blade 14 disposed on the intake chamber 12 side, a plurality of compressor stationary blades 16 fixed to the compressor casing 10 side, and a plurality of compressor rotor blades 18 implanted on the rotor 8 so as to be arrayed alternately with the compressor stationary blades 16 in the axial direction. The compressor 2 may include another constituent element such as an extraction chamber (not shown). In such compressor 2, the air sucked in from the intake chamber 12 is compressed through the plurality of compressor stationary blades 16 and the plurality of compressor rotor blades 18, generating the compressed air. The compressed air is sent from the compressor 2 to the combustor 4 on the axially downstream side.

The combustor 4 is disposed in a casing 20. As shown in FIG. 1, a plurality of combustors 4 may be disposed in annular shape centered at the rotor 8 in the casing 20. The combustor 4 is supplied with fuel and the compressed air generated in the compressor 2, and burns the fuel to produce the combustion gas G which has a high pressure and a high temperature and serves as a working fluid for the turbine 6. The produced combustion gas G is sent from the combustor 4 to the turbine 6 at a latter stage on the axially downstream side.

The turbine 6 includes a turbine casing 22 and a variety of turbine blades disposed in the turbine casing 22. The variety of turbine blades includes a plurality of turbine stationary blades 24 fixed to the turbine casing 22 side and a plurality of turbine rotor blades 26 implanted on the rotor 8 so as to be arrayed alternately with the turbine stationary blades 24 in the axial direction.

In the turbine 6, the rotor 8 extends in the axial direction, and the combustion gas G discharged from the turbine casing 22 is discharged to an exhaust casing 28 on the axially downstream side. In FIG. 1, a left side in the drawing is an axially upstream side and a right side in the drawing is the axially downstream side. Further, in the following description, when simply described as the radial direction, it represents a direction orthogonal to the rotor 8. Further, when described as the circumferential direction, it represents a rotation direction of the rotor 8.

The turbine rotor blades 24 are configured to generate a rotational driving force from the combustion gas G which has the high temperature and the high pressure and flows in the turbine casing 22 with the turbine stationary blades 24. This rotational driving force is transmitted to the rotor 8 to drive the generator (not shown) connected to the rotor 8.

An exhaust hood 29 is connected to the axially downstream side of the turbine casing 22 via the exhaust casing 28. The combustion gas G having driven the turbine 6 is discharged to the outside through the exhaust casing 28 and the exhaust hood 29.

<<Configuration of Turbine Stationary Blade>>

Figure 2:
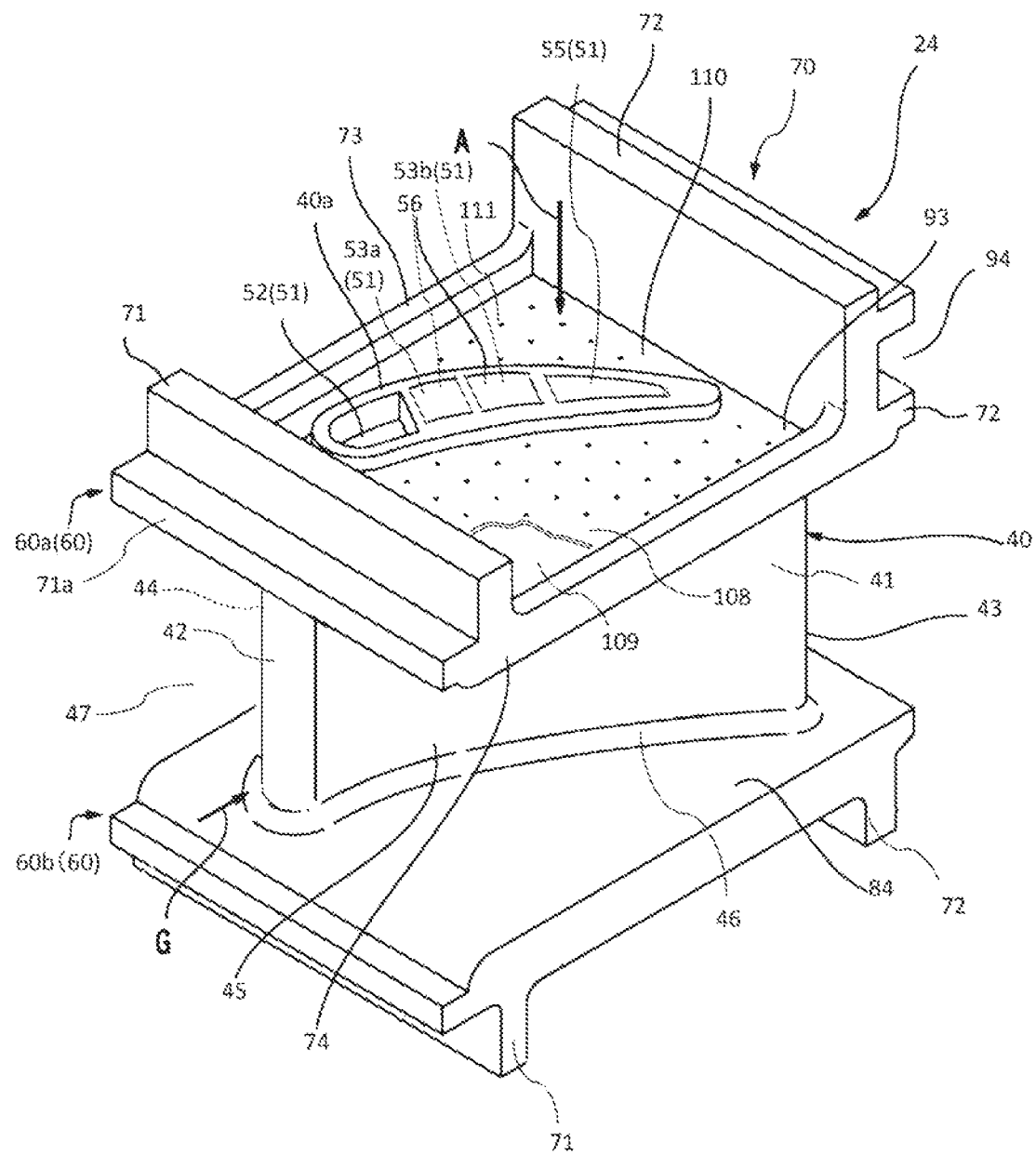
FIG. 2 is a perspective view of a turbine stationary blade according to an embodiment of the present disclosure.

As shown in FIG. 2, the stationary blade 24 of the turbine 6 includes a blade body 40 extending in a blade height direction and shrouds 60 at both ends of the blade body 40 in the blade height direction. The shrouds 60 include an outer shroud 60a formed on an outer side of the blade body 40 in the blade height direction, and an inner shroud 60b formed on an inner side of the blade body 40 in the blade height direction. The blade body 40 is disposed in a combustion gas flow passage 47 through which the combustion gas G passes. The outer shroud 60a defines an outer position of the annular combustion gas flow passage 47 in the blade height direction. The inner shroud 60b defines an inner position of the annular combustion gas flow passage 47 in the blade height direction.

A hook 94 for supporting the stationary blade 24 in the turbine casing 22 is provided on a trailing edge 43 side of the blade body 40 in the outer shroud 60a of the stationary blade 40. The hook 94 of the stationary blade 24 is disposed on a peripheral wall 70 on the trailing edge 43 side of the outer shroud 60a.

As shown in FIGS. 2 to 5, the blade body 40 forms a blade shape. The blade body 40 extends in the blade height direction, is connected to the outer shroud 60a via a fillet portion 46 (FIG. 4) on the outer side in the blade height direction, and is connected to the inner shroud 60b via the fillet portion 46 on the inner side in the blade height direction. The blade body 40 forms the turbine stationary blade 24 together with the outer shroud 60a and the inner shroud 60b. Blade body end portions 40a of the blade body 40 on the outer side of the blade body 40 in the blade height direction and the inner side of the blade body 40 in the blade height direction slightly projects outward in the blade height direction and inward in the blade height direction, respectively, from inner surfaces 83 of bottom plates 82 of the outer shroud 60a and the inner shroud 60b.

The blade body 40 has a leading edge 42 axially upstream and the trailing edge 43 axially downstream. The blade body 40 has, of a surface of a blade surface 41 facing in the circumferential direction, a suction surface 44 forming a convex surface and a pressure surface 45 forming a concave surface. The suction surface 44 and the pressure surface 45 join at the leading edge 42 and the trailing edge 43, and together form the single blade body 40. In the following description, the pressure side of the blade body 40 may be referred to as a concave side, and the suction side of the blade body 40 may be referred to as a convex side in the circumferential direction.

Figure 3:
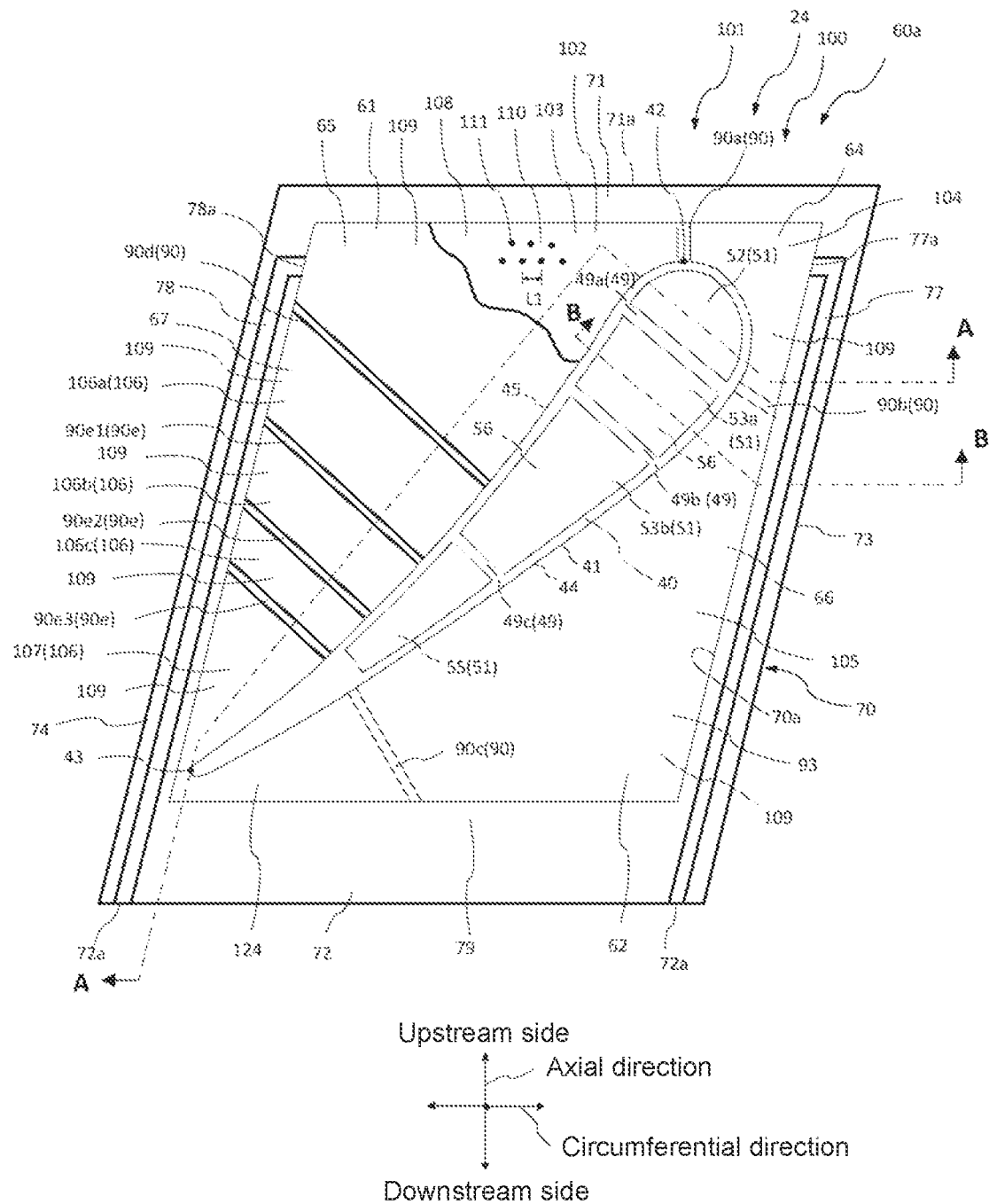
FIG. 3 is a plane cross-sectional view of an outer shroud.
Figure 4:
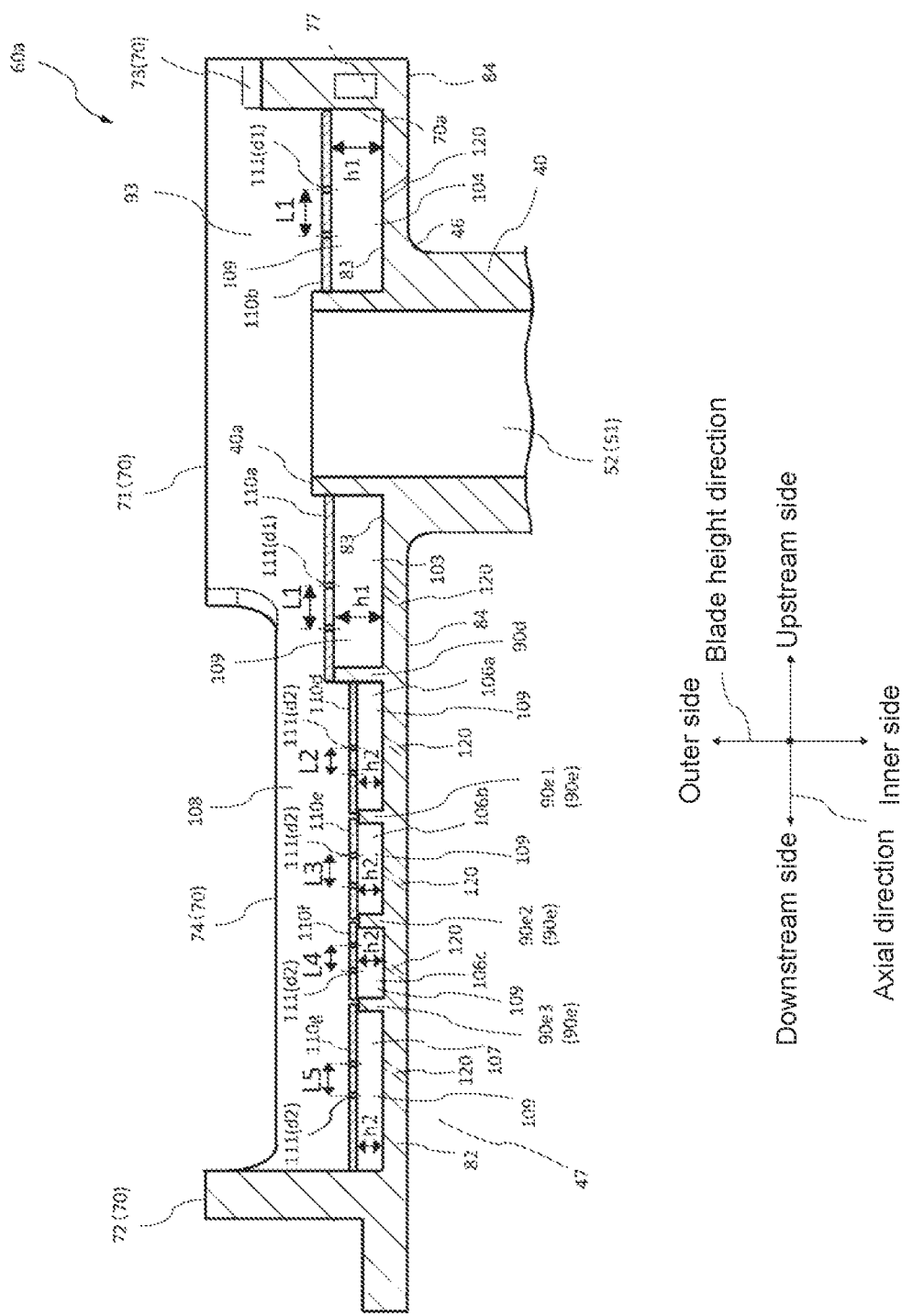
FIG. 4 is a cross-sectional view taken along line A-A in FIG. 3.

As shown in FIGS. 2 and 3, the blade body 40 includes a blade body air passage 51 which extends in the blade height direction and inside of which cooling air flows. The blade body air passage 51 is formed continuously in a range from the outer shroud 60a to the inner shroud 60b. In the present embodiment, FIG. 4 shows, as an example, an example in which four blade body air passages 51 are disposed in a leading edge-trailing edge direction connecting the leading edge 42 and the trailing edge 43 of the blade body 40.

The blade body air passage 51 is divided into a plurality of passages by a plurality of blade body partition ribs 49 each of which has one end connected to a blade wall 40b on the suction surface 44 side and another end connected to the blade wall 40b on the pressure surface 45 side. The blade body air passage 51 is composed of a blade body leading edge air passage 52 disposed on the leading edge 42 side of the blade body 40, a blade body intermediate air passage 53 disposed adjacent to the axially downstream side of the blade body leading edge air passage 52, and a blade body trailing edge air passage 55 disposed adjacent to the axially downstream side of the blade body intermediate air passage 53. The blade body intermediate air passage 53 is divided into two parts in the leading edge-trailing edge direction, and is composed of a first blade body intermediate air passage 53a on the leading edge 42 side and a second blade body intermediate air passage 53b on the trailing edge 43 side. The blade body leading edge air passage 52 disposed on the leading edge 42 side is disposed adjacent to the first blade body intermediate air passage 53a of the blade body intermediate air passage 53 with a blade body leading edge partition rib 49a being interposed between the blade body leading edge air passage 52 and the first blade body intermediate air passage 53a axially downstream. The blade body trailing edge air passage 55 is disposed adjacent to the trailing edge 43 side in the leading edge-trailing edge direction relative to the blade body intermediate air passage 53, with a blade body trailing edge partition rib 49c formed axially upstream of the blade body trailing edge air passage 55 being interposed between the blade body trailing edge air passage 55 and the blade body intermediate air passage 53. The first blade body intermediate air passage 53a and the second blade body intermediate air passage 53b forming the blade body intermediate air passage 53 are disposed adjacent to each other in the leading edge-trailing edge direction with a blade body intermediate partition rib 49b being interposed between the first blade body intermediate air passage 53a and the second blade body intermediate air passage 53b. The respective blade body air passages 51 open to the shroud 60 of either the outer shroud 60a or the inner shroud 60b without communicating with each other, and the blade body end portion 40a of the another blade body air passage 51 is provided with a lid 56 or the like and is closed.

Figure 5:
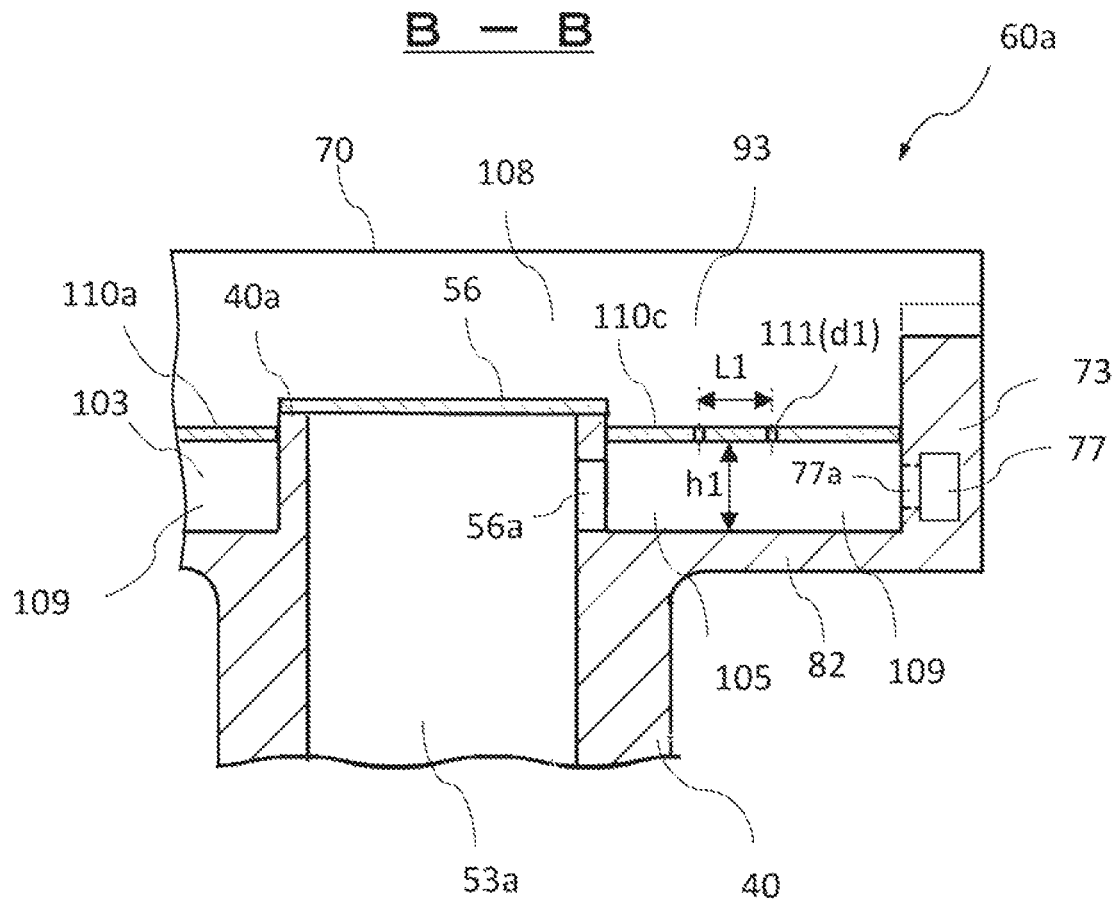
FIG. 5 is a cross-sectional view taken along line B-B in FIG. 3.
Figure 5:
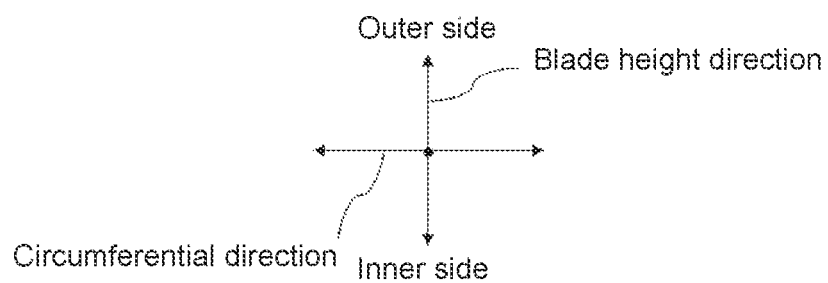

One of the first blade body intermediate air passage 53a and the second blade body intermediate air passage 53b forming the blade body intermediate air passage 53 is connected to an inner cavity 109 of a suction side intermediate cavity 105 in the outer shroud 60a, which will be described later, via an opening 56a formed in the blade body end portion 40a, at a position of the blade body intermediate air passage 53 (for example, the first blade body intermediate air passage 53a) connected to the outer shroud 60a (FIG. 5). Likewise, the other second blade body intermediate air passage 53b is connected to the inner cavity 109 of the suction side intermediate cavity 105 in the inner shroud 60b, which will be described later, via an opening (not shown) formed at a position connected to the inner shroud 60b.

The blade body air passage 51 of the blade body 40 shown in FIGS. 2 and 3 is the example where the blade body intermediate air passage 53 is divided into the two parts in the leading edge-trailing edge direction and is composed of the first blade body intermediate air passage 53a and the second blade body intermediate air passage 53b. However, the blade body intermediate air passage 53 may be formed as the one blade body intermediate air passage 53 without being divided into the two parts. In this case, the intermediate cavities of the suction surface intermediate cavities 105 on both sides of the outer shroud 60a and the inner shroud 60b may be connected to the respective openings 56a (not shown) formed at both ends of the blade body end portion 40a.

<<Configuration of Outer Shroud>

As shown in FIGS. 3 and 4, the outer shroud 60a is composed of the bottom plate 82 forming a bottom surface of the shroud 60, the peripheral wall 70 formed at an outer peripheral edge of the bottom plate 82 and standing upright from the inner surface 83 of the bottom plate 82 in the blade height direction, the partition ribs 90 dividing a recess 93 formed by the bottom plate 82 and the peripheral wall 70 into a plurality of cavities 100, and an impingement plate 110 dividing each cavity 100 into an outer cavity 108 on the outer side in the blade height direction and the inner cavity 109 on the inner side in the blade height direction. The impingement plate 110 disposed in each cavity 100 has a plurality of through holes 111 via which the outer cavity 108 and the inner cavity 109 communicate with each other.

The peripheral wall 70 is composed of a leading edge end portion 71 formed on the axially upstream leading edge 42 side, a trailing edge end portion 72 disposed to be opposed to the leading edge end portion 71 axially downstream and extending in the circumferential direction on the trailing edge 43 side, a suction side end portion 73 formed in an end portion on the suction surface 44 side of the blade body 40 in the circumferential direction, and a pressure side end portion 74 disposed to be opposed to the suction side end portion 73 in the circumferential direction and formed in an end portion on the pressure surface 45 side of the blade body 40. The bottom plate 82 includes a gas path surface 84 in contact with the combustion gas flow passage 47 on the inner side in the blade height direction, and the inner surface (opposite flow passage surface) 83 facing the outer side in the blade height direction, which is an opposite flow passage side in a direction opposite to the gas path surface 84.

In the outer shroud 60a exemplified in the present embodiment, the leading edge end portion 71 and the trailing edge end portion 72 are substantially parallel, and the suction side end portion 73 and the pressure side end portion 74 are substantially parallel. Therefore, the shape of the outer shroud 60a is a parallelogram when viewed from the blade height direction.

The pressure side end portion 74 of the outer shroud 60a in the one stationary blade 24 (24a) of the two turbine stationary blades 24 (FIG. 3, 8) adjacent in the circumferential direction is disposed, with a gap 68 in the circumferential direction, to be opposed to the suction side end portion 73 of the outer shroud 60a in the another stationary blade 24 (24b).

<<Configuration of Partition Rib in Outer Shroud>>

FIG. 3 shows a plane cross-sectional view of the outer shroud 60a viewed from the outer side in the blade height direction, and FIG. 4 shows a cross-sectional view taken along line A-A in FIG. 3. FIG. 5 shows a cross-sectional view taken along line B-B in FIG. 3.

The outer shroud 60a includes the plurality of partition ribs 90 each having a projecting cross section, and the partition ribs 90 divide the recess 93, which is a space surrounded by the peripheral wall 70 and the blade body end portion 40a of the blade body 40, into the plurality of cavities 100 to form a multi-cavity 101. The partition ribs 90 project outward in the blade height direction from the inner surface 83 of the bottom plate 82 in the outer shroud 60a, extends along the inner surface 83, and joins the blade body end portion 40a of the blade body 40 and an inner wall 70a of the peripheral wall 70. As shown in FIG. 3, in the outer shroud 60a of the present embodiment, seven partition ribs 90 are formed and eight cavities 100 are formed.

Figure 6:
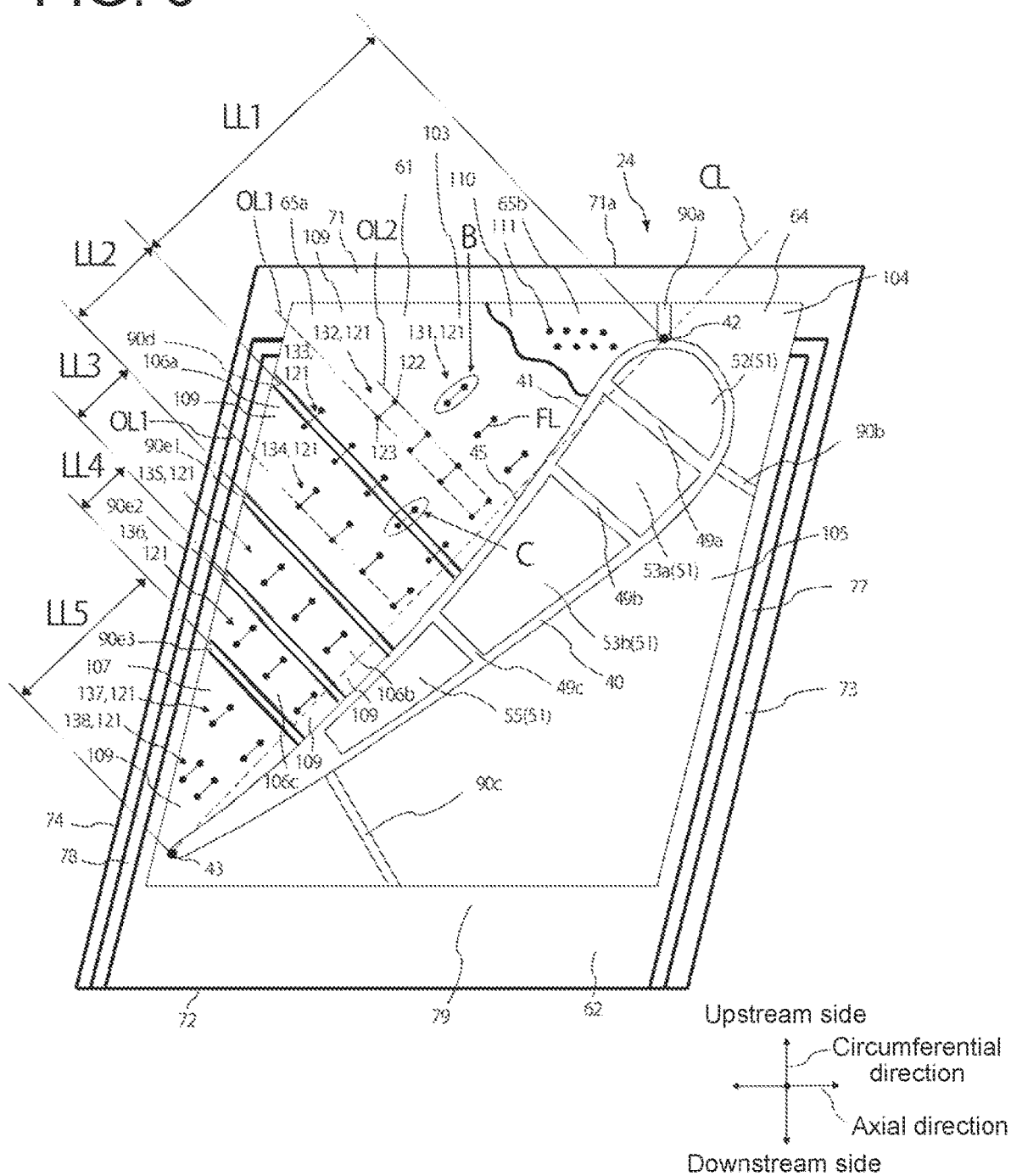
FIG. 6 is a plane cross-sectional view of a shroud.

A leading edge partition rib 90a (third partition rib) connecting the leading edge end portion 71 and the blade body end portion 40a at the leading edge 42 of the blade body 40 is disposed in a leading edge portion 61 of the outer shroud 60a. A position where the leading edge partition rib 90a is connected to the blade body 40 is a position of the leading edge 42 on the blade surface 41 where the suction surface 44 and the pressure surface 45 forming the blade body 40 are connected axially upstream. A suction side leading edge partition rib 90b (fourth partition rib) connecting the suction side end portion 73 and the blade body end portion 40a on the suction surface 44 side of the blade body 40 is disposed at a position near the leading edge portion 61 side of the suction side end portion 73 in the outer shroud 60a. A suction side trailing edge partition rib 90c connecting the trailing edge end portion 72 and the blade body end portion 40a at a position near the trailing edge 43 side of the blade body 40 is disposed in the trailing edge portion 62 of the outer shroud 60a. The four partition ribs 90 connecting the pressure side end portion 74 and the blade body end portion 40a on the pressure surface 45 side of the blade body 40 are disposed in the pressure side end portion 74. A pressure side leading edge partition rib 90d (first partition rib) is disposed at a position closest to the leading edge portion 61 on the axially upstream side of the outer shroud 60a. Further, three intermediate partition ribs 90e (second partition ribs) are disposed axially downstream of the pressure side leading edge partition rib 90d. The intermediate partition rib 90e is composed of a first intermediate partition rib 90e1 closest to the pressure side leading edge partition rib 90d, a second intermediate partition rib 90e2 disposed axially downstream of the first intermediate partition rib 90e1, and a third intermediate partition rib 90e3 disposed axially downstream of the second intermediate partition rib 90e2. The suction side leading edge partition rib 90b is connected to the vicinity of a position of the blade body leading edge partition rib 49a dividing between the blade body intermediate air passage 53 and the blade body leading edge air passage 52 of the blade body end portion 40a. The suction side trailing edge partition rib 90c is connected to a position between the trailing edge 43 and a position where the blade body trailing edge air passage 55 of the blade body end portion 40a is disposed. The pressure side leading edge partition rib 90d is connected to a position near an upstream end 78a of a pressure side passage 78, which is an intermediate position in a range where the blade body intermediate air passage 53 of the blade body end portion 40a is formed, the pressure side leading edge partition rib 90d being connected between the leading edge 42 and the position of the blade body trailing edge partition rib 49c, and the pressure side end portion 74 side is the axially downstream side of the upstream end 78a. The intermediate partition rib 90e is disposed in a range from the intermediate position of the range where the blade body trailing edge air passage 55 of the blade body end portion 40a is formed to the position of the trailing edge 43 of the blade body 40, and the pressure side end portion 74 side is connected to the axially downstream side of the upstream end 78a of the pressure side passage 78. The first intermediate partition rib 90e1 and the second intermediate partition rib 90e2 are connected to the range where the blade body trailing edge air passage 55 of the blade body end portion 40a is formed. The third intermediate partition rib 90e3 is connected to the position between the trailing edge 43 and the position where the blade body trailing edge air passage 55 of the blade body end portion 40a is formed. As shown in FIG. 6, the pressure side leading edge partition rib 90d disposed on the pressure surface 45 side of the blade body 40 and the intermediate partition rib 90e composed of the plurality of partition ribs 90 are disposed to substantially be orthogonal to a chord direction line CL connecting the leading edge 42 and the trailing edge 43 of the blade body 40, and to be parallel to each other.

<<Configuration of Multi-Cavity in Outer Shroud>>

As shown in FIG. 3, the multi-cavity 101 of the outer shroud 60a is constituted by the plurality of cavities 100 as described below. The leading edge 42 side of the outer shroud 60a is divided, by providing the leading edge partition rib 90a, into a suction side leading edge cavity (third cavity) 104 disposed in a suction side leading edge region 64 of the shroud 60 and a pressure side leading edge cavity (first cavity) 103 disposed in a pressure side leading edge region 65. The pressure side leading edge cavity 103 is an area defined by the leading edge partition rib 90a on the axially upstream side and the pressure side leading edge partition rib 90d on the axially downstream side. This area is an area formed along the blade body intermediate air passage 53 and an area formed along the blade surface 41 on the pressure surface 45 side from the leading edge 42 of the blade body leading edge air passage 52 formed in the blade body 40. The suction side leading edge cavity 104 is an area defined by the leading edge partition rib 90a on the axially upstream side and the suction side leading edge partition rib 90b on the axially downstream side. This area is an area formed along the blade surface 41 on the suction surface 44 side from the leading edge 42 of the blade body leading edge air passage 52 formed in the blade body 40. The pressure side leading edge cavity 103 is connected to the upstream end 78a of the pressure side passage 78 in the pressure side end portion 74 via the inner cavity 109 described later. The suction side leading edge cavity 104 is connected to an upstream end 77a of a suction side passage 77 in the suction side end portion 73 via the inner cavity 109.

In the suction side intermediate region 66 of the outer shroud 60a, the suction side intermediate cavity 105 is disposed adjacent to the axially downstream side of the suction side leading edge cavity 104 with the suction side leading edge partition rib 90b being interposed therebetween. The suction side intermediate cavity 105 is an area defined by the suction side leading edge partition rib 90b and the suction side trailing edge partition rib 90c on the axially downstream side. This area is a range along the blade body trailing edge air passage 55 and the blade body intermediate air passage 53 formed in the blade body 40. The suction side intermediate cavity 105 is connected to the blade body intermediate air passage 53 via the opening 56a formed in the blade body end portion 40a connected to the inner cavity 109. The suction side trailing edge cavity 124 formed between the suction side trailing edge partition rib 90c and the trailing edge end portion 72 and extending to the trailing edge 43 of the blade body 40 is disposed axially downstream of the suction side intermediate cavity 105.

In the pressure side intermediate region 67 of the outer shroud 60a, the pressure side intermediate cavity 106 (second cavity), which is adjacent to the axially downstream side of the pressure side leading edge cavity 103 and is constituted by the plurality of cavities 100, is formed with the pressure side leading edge partition rib 90d interposed between the pressure side intermediate cavity 106 and the pressure side leading edge cavity 103. The pressure side intermediate cavity 106 is formed in a region sandwiched between the pressure side leading edge partition rib 90d and the trailing edge end portion 72 on the axially downstream side. This area is the range that includes the position of the blade body trailing edge partition rib 49c which defines the axially downstream position of the blade body intermediate air passage 53 formed in the blade body 40, and the range that is formed along the blade surface 41 on the pressure surface 45 side up to the trailing edge 43 of the blade body 40. In the aspect shown in FIG. 3, the pressure side intermediate cavities 106 are axially disposed in tandem along the blade surface 41 on the pressure surface 45 side in order of the first intermediate cavity 106a, the second intermediate cavity 106b and the third intermediate cavity 106c, and the pressure side trailing edge cavity 107, in the axial leading edge-trailing edge direction. The pressure side trailing edge cavity 107 located most axially downstream of the pressure side intermediate cavity 106 is disposed most axially downstream of the intermediate partition rib 90e, and between the trailing edge 43 of the blade body 40 and the third intermediate partition rib 90e3 connected to the blade body 40 at a position between the trailing edge 43 and the axially downstream end of the blade body trailing edge air passage 55.

In the aspects shown in FIGS. 3 and 4, the example is shown in which the three intermediate partition ribs 90e are disposed and the four pressure side intermediate cavities 106 are disposed. However, the number of arrayed cavities of the pressure side intermediate cavities 106 is not limited to the four cavities shown in the present example, but may be three cavities or at least five cavities. Note that it remains unchanged that the position where the partition rib 90 on the most axially downstream side among the intermediate partition ribs 90e is connected to the blade body 40 is the position between the trailing edge 43 and the axially downstream end of the blade body trailing edge air passage 55.

<<Configuration of Impingement Plate in Outer Shroud>>

As shown as an example in FIGS. 3 to 5, the impingement plate 110 is disposed in the cavity 100 divided by the partition rib 90 of the outer shroud 60a, and the space of the recess 93 is divided into the outer cavity 108 and the inner cavity 109 in the blade height direction. The impingement plate 110 has the plurality of through holes 111, and the outer cavity 108 and the inner cavity 109 communicate with each other via the through holes 111. The impingement plate 110 is fixed to a top surface of the end portion, of the partition rib 90 disposed in the outer shroud 60a, extending in the blade height direction, the inner wall 70a of the peripheral wall 70, and the blade body end portion 40a of the blade body 40. The outer cavity 108 is a space which is formed on the outer side of the outer shroud 60a in the blade height direction and extends among the leading edge end portion 71, the trailing edge end portion 72, the suction side end portion 73, and the pressure side end portion 74. The inner cavity 109 is a collection of the plurality of cavities 100, which is disposed on the inner side of the outer cavity 108 via the impingement plate 110 and is internally formed with individual spaces by the impingement plate 110 in the blade height direction.

<<Trailing Edge End Portion of Outer Shroud>>

As shown in FIG. 3, the outer shroud 60a includes the suction side passage 77 for cooling the suction side end portion 73, and a pressure side passage 78 for cooling the pressure side end portion 74. The suction side passage 77 is formed inside the suction side end portion 73 extending in the leading edge-trailing edge direction, and is connected to the opening 72a formed in the trailing edge end portion 72 on the axially downstream side. The pressure side passage 78 is formed inside the pressure side end portion 74 extending in the leading edge-trailing edge direction, and is connected to the opening 72a formed in the trailing edge end portion 72 on the axially downstream side.

<<Configuration of Inner Shroud>>

The configuration of the inner shroud 60b is substantially the same as the configuration of the outer shroud 60a described above. That is, the structure shown in FIG. 3 is an example of the outer shroud 60a, but the structure shown in FIG. 3 is also applicable to the structure of the inner shroud 60b. Therefore, for the names and reference signs of the respective components of the inner shroud 60b, the description of the respective components of the outer shroud 60a may be used as they are, except for the components with particular description. Also in the following description with reference to FIGS. 4 to 8, the description relating to the outer shroud 60a is also applicable to the inner shroud 60b, unless otherwise specified. In the case of the inner shroud 60b, the outer side of the outer shroud 60a in the blade height direction is read as the inner side in the blade height direction, and the inner side in the blade height direction is read as the outer side in the blade height direction.

<<Multi-Cavity of Shroud>>

With the above configuration, the shroud 60 connects the peripheral wall 70 and the blade body end portion 40a of the blade body 40 by using the plurality of partition ribs 90, divides the recess 93 of the shroud 60, and forms the multi-cavity 101 constituted by the plurality of cavities 100. The partition rib 90 extends to the outer side (opposite flow passage side) in the blade height direction from the inner surface 83 of the bottom plate 82 of the shroud 60, radially extends from the blade body end portion 40a toward the peripheral wall 70 side, and forms the plurality of cavities 100 on an outer peripheral side of the blade body 40 so as to surround the blade body 40, thereby achieving multi-cavity of the shroud 60. The respective cavities 100 are independent of each other and do not have a structure where cooling air flows among the cavities 100.

In the following description, each embodiment will be described with regard to differences in structure and function, action, effect between the cavities associated with multi-cavity of the shroud 60 in the turbine stationary blade 24. In the following description of the embodiments, the shroud 60 including the outer shroud 60a and the inner shroud 60b will be described. Therefore, the shroud 60 is applicable to both the outer shroud 60a and the inner shroud 60b, unless otherwise specified.

First Embodiment

The difference in impingement cooling structure among the respective cavities 100 will be described below with reference to FIGS. 3 and 4, by comparing the structure of the pressure side intermediate cavity 106 with the structure of the remaining other cavities (the leading edge side cavity 100 (the pressure side leading edge cavity 103, the suction side leading edge cavity 104), the suction side intermediate cavity 105) among the cavities 100 forming the multi-cavity 101 of the shroud 60.

In FIGS. 3 and 4, as described above, the pressure side leading edge cavity 103 includes a first impingement plate 110a dividing the outer cavity 108 on the outer side in the blade height direction in the recess 93 of the shroud 60 from the inner cavity 109 on the inner side in the blade height direction. The formed inner cavity 109 constitutes the pressure side leading edge cavity 103. The inner cavity 109 formed by disposing the first impingement plate 110a has a space surrounded by the inner surface 83 of the bottom plate 82, the blade body end portion 40a, the inner wall 70a of the peripheral wall 70, and the partition ribs 90 (the leading edge partition rib 90a, the pressure side leading edge partition rib 90d). The first impingement plate 110a is formed with the plurality of through holes 111, and the outer cavity 108 and the inner cavity 109 communicate with each other via the through holes 111. A plurality of cooling holes 120 are formed in the bottom plate 82 and open at the gas path surface 84 which is the outer surface of the bottom plate 82. The inner cavity 109 which is the pressure side leading edge cavity 103 is connected to the upstream end 78a of the pressure side passage 78 formed in the pressure side end portion 74.

The suction side leading edge cavity 104 includes a second impingement plate 110b dividing the recess 93 of the shroud 60 into the outer cavity 108 on the outer side in the blade height direction and the inner cavity 109 on the inner side in the blade height direction. The formed inner cavity 109 constitutes the suction side leading edge cavity 104. The inner cavity 109 formed by disposing the second impingement plate 110b has a space surrounded by the inner surface 83 of the bottom plate 82, the blade body end portion 40a, the inner wall 70a of the peripheral wall 70, and the partition ribs 90 (the leading edge partition rib 90a, the suction side leading edge partition rib 90b). The second impingement plate 110b is formed with the plurality of through holes 111, and the outer cavity 108 and the inner cavity 109 communicate with each other via the through holes 111. The plurality of cooling holes 120 are formed in the bottom plate 82 and open at the gas path surface 84 which is the outer surface of the bottom plate 82. The inner cavity 109 which is the suction side leading edge cavity 104 is connected to the upstream end 77a of the suction side passage 77 formed in the suction side end portion 73.

The suction side intermediate cavity 105 includes a third impingement plate 110c dividing the outer cavity 108 on the outer side in the blade height direction in the recess 93 of the shroud 60 from the inner cavity 109 on the inner side in the blade height direction. The formed inner cavity 109 constitutes the suction side intermediate cavity 105. The inner cavity 109 formed by disposing the third impingement plate 110c has a space surrounded by the inner surface 83 of the bottom plate 82, the blade body end portion 40a, the inner wall 70a of the peripheral wall 70, and the partition ribs 90 (the suction side leading edge partition rib 90b, the suction side trailing edge partition rib 90c). The third impingement plate 110c is formed with the plurality of through holes 111, and the outer cavity 108 and the inner cavity 109 communicate with each other via the through holes 111. The bottom plate 82 does not have the cooling holes 120, and as shown in FIG. 5, the inner cavity 109 which is the suction side intermediate cavity 105 is connected to the blade body intermediate air passage 53 via the opening 56a of the blade body intermediate air passage 53 formed in the blade body 40.

The first intermediate cavity 106a on the most axially downstream side among the pressure side intermediate cavities 106 includes a fourth impingement plate 110d dividing the outer cavity 108 on the outer side in the blade height direction in the recess 93 of the shroud 60 from the inner cavity 109 on the inner side in the blade height direction. The formed inner cavity 109 constitutes the first intermediate cavity 106a among the pressure side intermediate cavities 106. The inner cavity 109 formed by disposing the fourth impingement plate 110d has a space surrounded by the inner surface 83 of the bottom plate 82, the blade body end portion 40a, the inner wall 70a of the peripheral wall 70, and the partition ribs 90 (the pressure side leading edge partition rib 90d, the first intermediate partition rib 90e1). The fourth impingement plate 110d is formed with the plurality of through holes 111, and the outer cavity 108 and the inner cavity 109 communicate with each other via the through holes 111. The plurality of cooling holes 120 are formed in the bottom plate 82 and open at the gas path surface 84 which is the outer surface of the bottom plate 82.

The second intermediate cavity 106b among the pressure side intermediate cavities 106 is disposed axially downstream adjacent to the first intermediate cavity 106a, and includes a fifth impingement plate 110e dividing the outer cavity 108 on the outer side in the blade height direction in the recess 93 of the shroud 60 from the inner cavity 109 on the inner side in the blade height direction. The formed inner cavity 109 constitutes the second intermediate cavity 106b among the pressure side intermediate cavities 106. The inner cavity 109 formed by disposing the fifth impingement plate 110e has a space surrounded by the inner surface 83 of the bottom plate 82, the blade body end portion 40a, the inner wall 70a of the peripheral wall 70, and the partition ribs 90 (the first intermediate partition rib 90e1, the second intermediate partition rib 90e2). The fifth impingement plate 110e is formed with the plurality of through holes 111, and the outer cavity 108 and the inner cavity 109 communicate with each other via the through holes 111. The plurality of cooling holes 120 are formed in the bottom plate 82 and open at the gas path surface 84 which is the outer surface of the bottom plate 82.

The third intermediate cavity 106c among the pressure side intermediate cavities 106 includes a sixth impingement plate 110f dividing the outer cavity 108 on the outer side in the blade height direction in the recess 93 of the shroud 60 from the inner cavity 109 on the inner side in the blade height direction. The formed inner cavity 109 constitutes the third intermediate cavity 106c among the pressure side intermediate cavities 106. The inner cavity 109 formed by disposing the sixth impingement plate 110f has a space surrounded by the inner surface 83 of the bottom plate 82, the blade body end portion 40a of the blade body 40, the inner wall 70a of the peripheral wall 70, and the partition ribs 90 (the second intermediate partition rib 90e2, the third intermediate partition rib 90e3). The sixth impingement plate 110f is formed with the plurality of through holes 111, and the outer cavity 108 and the inner cavity 109 communicate with each other via the through holes 111. The plurality of cooling holes 120 are formed in the bottom plate 82 and open at the gas path surface 84 which is the outer surface of the bottom plate 82.

The pressure side trailing edge cavity 107 among the pressure side intermediate cavities 106 includes a seventh impingement plate 110g dividing the outer cavity 108 on the outer side in the blade height direction in the recess 93 of the shroud 60 from the inner cavity 109 on the inner side in the blade height direction. The formed inner cavity 109 constitutes the pressure side trailing edge cavity 107 among the pressure side intermediate cavities 106.

The inner cavity 109 formed by disposing the seventh impingement plate 110g has a space surrounded by the inner surface 83 of the bottom plate 82, the blade body end portion 40a on the trailing edge 43 side of the blade body 40, the inner wall 70a of the peripheral wall 70, and the partition rib 90 (the third intermediate partition rib 90e3). The seventh impingement plate 110g is formed with the plurality of through holes 111, and the outer cavity 108 and the inner cavity 109 communicate with each other via the through holes 111. The plurality of cooling holes 120 are formed in the bottom plate 82 and open at the gas path surface 84 which is the outer surface of the bottom plate 82.

As shown in FIGS. 4 and 5, the impingement plates 110 (the first impingement plate 110a, the second impingement plate 110b, the third impingement plate 110c) fixed to the pressure side leading edge cavity 103, the suction side leading edge cavity 104, the suction side intermediate cavity 105 are fixed at a position of a height h1 in the outer side (opposite flow passage side) direction in the blade height direction from the inner surface 83 of the bottom plate 82, and the through holes 111 each having a hole diameter d1 and an array pitch L1 are arrayed. On the other hand, the impingement plates 110 (the fourth impingement plate 110d, the fifth impingement plate 110e, the sixth impingement plate 110f, the seventh impingement plate 110g) fixed to the pressure side intermediate cavities 106 (the first intermediate cavity 106a, the second intermediate cavity 106b, the third intermediate cavity 106c, the pressure side trailing edge cavity 107) are fixed at a position of a height h2 in the outer side (opposite flow passage side) direction in the blade height direction from the inner surface 83 of the bottom plate 82, and the through holes 111 each having a hole diameter d2 are arrayed. Further, in the aspect shown in FIG. 4, the through holes 111 of the impingement plates 110 (the fourth impingement plate 110d, the fifth impingement plate 110e, the sixth impingement plate 110f, the seventh impingement plate 110g) fixed to the pressure side intermediate cavities 106 are formed such that the fourth impingement plate 110d has an array pitch L2, the fifth impingement plate 110e has an array pitch L3, the sixth impingement plate 110f has an array pitch L4, and the seventh impingement plate 110g has an array pitch L5.

As described above, in the pressure side leading edge cavity 103, the suction side leading edge cavity 104, and the suction side intermediate cavity 105 disposed in the leading edge portion 61 and the suction side intermediate region 66, relative to the hole diameter d1 of the through hole 111 in the impingement plate 110 (the first impingement plate 110a, the second impingement plate 110b, the third impingement plate 110c) applied, a diameter hole of the through hole 111 in the impingement plate 110 applied to the pressure side intermediate cavity 106 (the first intermediate cavity 106a, the second intermediate cavity 106b, the third intermediate cavity 106c, the pressure side trailing edge cavity 107) is formed with a hole diameter d2 smaller than the hole diameter d1. On the other hand, as a mounting height h of the impingement plate 110 from the inner surface 83 of the bottom plate 82, relative to a height h1 of the second impingement plate 110a, the third impingement plate 110b, and the fourth impingement plate 110c, the mounting height of the fifth impingement plate 110d, the sixth impingement plate 110e, and the seventh impingement plate 110f in the pressure side intermediate cavities106 is selected to be a height h2 lower than the height h1. The array of the through holes 111 may be a staggered array or may be a square array.

The reason that the height of the impingement plate 110, and a hole diameter d and an array pitch L of the through hole 111 are different depending on the cavity 100 is as follows. As described above, the suction side leading edge cavity 104 has a structure connected to the suction side passage 77 in addition to the cooling hole 120 formed in the bottom plate 82. The pressure side leading edge cavity 103 has a structure connected to the pressure side passage 78 in addition to the cooling hole 120 formed in the bottom plate 82. The suction side intermediate cavity 105 has a structure connected to the blade body intermediate air passage 53 of the blade body 40, though the cooling hole 120 is not formed in the bottom plate 82. The suction side leading edge cavity 104 and the pressure side leading edge cavity 103 disposed on the leading edge 42 side of the shroud 60 receive heat from the combustion gas G flowing in from the combustion gas flow passage 47 on the axially upstream side, overheating the gas path surface 84 of the shroud 60 centering around the leading edge 42 of the blade body 40. On the leading edge 42 side of the shroud 60, cooling air externally supplied to the outer cavity 108 of the shroud 60 is supplied to the inner cavity 109 from the through hole 111 of the impingement plate 110 and impinges on the inner surface 83 of the bottom plate 82, impingement-cooling the inner surface 83. Further, the cooling air after the impingement cooling film-cools the gas path surface 84 of the shroud 60 in the process of being discharged from the cooling hole 120 formed in the bottom plate 82 to the gas path surface 84. The leading edge 42 side of the shroud 60 suppresses thermal damage due to heat input from the combustion gas of the shroud 60, by a combination of impingement cooling and film cooling.

On the other hand, as described above, the suction side leading edge cavity 104 and the pressure side leading edge cavity 103 disposed on the leading edge 42 side of the shroud 60 are connected to the suction side passage 77 and the pressure side passage 78, and communicate with the opening 72a of the trailing edge end portion 72 on the axially downstream side. The cooling air externally supplied to the shroud 60 has the purpose of cooling the suction side end portion 73 and the pressure side end portion 74 formed with the suction side passage 77 and the pressure side passage 78, in addition to the purpose of cooling the gas path surface 84 of the shroud 60. In the case of the suction side leading edge cavity 104 and the pressure side leading edge cavity 103 of the leading edge portion 61, at least the amount of cooling air exceeding the amount of cooling air for cooling the bottom plate 82 of the cavity 100 is supplied to the inner cavity 109 of the suction side leading edge cavity 104 and the pressure side leading edge cavity 103. Part of the cooling air having impingement-cooled the inner surface 83 of the bottom plate 82 in the inner cavity 109 is further supplied to the suction side passage 77 and the pressure side passage 78. That is, the excess cooling air exceeding the amount of cooling air required to cool the gas path surface 84 and the inner surface 83 of the bottom plate 82 in the cavity 100 is supplied to the suction side leading edge cavity 104 and the pressure side leading edge cavity 103, and is supplied to the inner cavity 109 via the through hole 111 of the impingement plate 110. Since the cooling air supplied from the inner cavity 109 to the suction side passage 77 and the pressure side passage 78 is the cooling air after impingement-cooling the inner surface 83 of the bottom plate 82 in the inner cavity 109, the cooling air is reused by cooling the suction side passage 77 and the pressure side passage 78, reducing the cooling air amount.

Further, the suction side intermediate cavity 105 does not include the cooling hole 120 in the bottom plate 82. The gas path surface 84 of the bottom plate 82 in the suction side intermediate cavity 105 is not film-cooled, and the externally supplied cooling air only impingement-cools the inner surface 83 of the bottom plate 82 in the suction side intermediate cavity 105. The entire amount of the cooling air after the impingement cooling is supplied to the blade body intermediate air passage 53 of the blade body 40 to cool the blade body 40. The cooling air film-cools the blade body 40 in the process of being discharged from the cooling hole (not shown) of the blade body 40 formed in the blade body 40 to the combustion gas flow passage 47.

Most of the cooling air supplied to the suction side leading edge cavity 104 and the pressure side leading edge cavity 103, and the suction side intermediate cavity 105 is supplied to the suction side passage 77 and the pressure side passage 78, and the blade body intermediate air passage 53 to cool the suction side end portion 73, the pressure side end portion 74, and the blade body 40. Since the cooling air after impingement-cooling each cavity 100 is applied to any cooling air, the cooling air is reused and the cooling air amount is reduced, which is advantageous in terms of effective use of the cooling air.

Herein, the cooling air supplied to the pressure side leading edge cavity 103 and the suction side leading edge cavity 104, and the suction side intermediate cavity 105 is supplied with the excess cooling air exceeding the amount of the cooling air required to cool the respective cavities 100. On the other hand, the amount of the cooling air supplied to the pressure side intermediate cavities 106 (the first intermediate cavity 106a, the second intermediate cavity 106b, the third intermediate cavity 106c, the pressure side trailing edge cavity 107) is limited the amount of the cooling air required to cool the bottom plate 82 of the respective cavities 100. That is, assuming that the mounting heights of the impingement plates 110 disposed in the pressure side leading edge cavity 103, the suction side leading edge cavity 104, the suction side intermediate cavity 105, and the pressure side intermediate cavities 106 (the first intermediate cavity 106a, the second intermediate cavity 106b, the third intermediate cavity 106c, the pressure side trailing edge cavities 107) are the same and the opening densities of the through holes 111 are the same, as to the impingement cooling with respect to the bottom plate 82 of each cavity 100, proper impingement cooling may not be performed in terms of a cross flow of the cooling air. Herein, the opening density can be expressed as (d/L), where d is the hole diameter and L is the array pitch of the through hole 111.

That is, like the pressure side intermediate cavity 106, in the case where the mounting height h of the impingement plate 110 and the specifications (the hole diameter d, the array pitch L) of the through hole 111 are selected on the basis of the amount of the cooling air required to cool the bottom plate 82 of the cavity 100, if the same basis is applied to the impingement plate 110 of the suction side leading edge cavity 104 and the pressure side leading edge cavity 103, and the suction side intermediate cavity 105 supplied with the excess cooling air, the problem arises in that the proper impingement cooling is not performed.

That is, a jet of the cooling air supplied to the inner cavity 109 from the through hole 111 of the impingement plate 110 impinges on the inner surface 83 of the bottom plate 82, and then causes cooling air flow (cross flow) along the inner surface 83 within the inner cavity 109 toward the upstream end 77a of the suction side passage 77 or the upstream end 78a of the pressure side passage 78, or the opening 56a of the blade body intermediate air passage 53. As the flow velocity of this cross flow increases, the jet of the impingement cooling air ejected from the through hole 111 is reduced, a heat transfer coefficient of the jet of the cooling air on the inner surface 83 is decreased, which adversely affects the impingement cooling effect. On the other hand, in the case of the pressure side intermediate cavity 106, since only impingement cooling and film cooling are combined, the cooling air after the impingement cooling is discharged from the cooling hole 120 formed in the bottom plate 82 to the gas path surface 84 side, and thus the influence by the cross flow of the cooling air is small.

In order to reduce the influence of the cross flow, it is necessary to increase the mounting height h of the impingement plate 110 from the bottom plate 82 to decrease the flow velocity of the cross flow. Therefore, as shown in FIGS. 4 and 5, the mounting height h1 of the impingement plate 110 (the first impingement plate 110a, the second impingement plate 110b, the third impingement plate 110c) disposed in the pressure side leading edge cavity 103 and the suction side leading edge cavity 104, and the suction side intermediate cavity 5 is higher and deeper than the mounting height h2 of the impingement plate 110 (the fourth impingement plate 110d, the fifth impingement plate 110e, the sixth impingement plate 110f, the seventh impingement plate 110g) disposed in the pressure side intermediate cavities 106 (the first intermediate cavity 106a, the second intermediate cavity 106b, the third intermediate cavity 106c, the pressure side trailing edge cavity 107) (h1>h2) to decrease the flow velocity of the cross flow.

On the other hand, even though the mounting height h of the impingement plate 110 is increased, the jet of the cooling air diffuses before reaching the inner surface 83 if the hole diameter d of the through hole 111 is the same, which may decrease the heat transfer coefficient of the cooling air on the inner surface 83. Therefore, in the aspects shown in FIGS. 4 and 5, the hole diameter d1 of the impingement plate 110 disposed in the pressure side leading edge cavity 103 and the suction side leading edge cavity 104, and the suction side intermediate cavity 105 is larger than the hole diameter d2 of the impingement plate 110 (the fourth impingement plate 110d, the fifth impingement plate 110e, the sixth impingement plate 110f, the seventh impingement plate 110g) disposed in the pressure side intermediate cavity 106 (d1>d2). The momentum of the jet after the cooling air passes through the through hole 111 is increased by increasing the hole diameter d, suppressing the decrease in heat transfer coefficient of the cooling air on the inner surface 83.

In order to improve the cooling effect on the bottom plate 82 of the cavity 100, in addition to adjusting the specifications (the hole diameter d, the array pitch L) of the through hole 111, although a cooling structure is also conceivable in which a projecting pin (not shown) is disposed in the direction of the impingement plate 110 on the outer side in the blade height direction from the inner surface 83 of the bottom plate 82 to increase the cooling effect, this structure is not desirable for the present embodiment. This is because disposing the pin on the inner surface 83 of the bottom plate 82 increases the flow velocity of the cross flow of the cooling air after the impingement cooling described above and decreases the impingement cooling effect, which is counterproductive.

Second Embodiment

A difference in film cooling structure of the cavity 100 on the pressure surface 45 side of the blade body 40 among the cavities 100 forming the multi-cavity 101 of the shroud 60 will be described below with reference to FIGS. 6 to 9.

FIG. 6 shows a plane cross section of the shroud 60 (the outer shroud 60a, the inner shroud 60b). FIG. 6 is a plane cross-sectional view of the outer shroud 60a as viewed from the outer side in the blade height direction, and is a plane cross-sectional view of the inner shroud 60b as viewed from the inner side in the blade height direction. An example of a layout of the cooling holes 120 formed in the bottom plate 82 is shown in the pressure side leading edge cavity 103 and the pressure side intermediate cavity 106 on the pressure surface 45 side of the shroud 60.

The pressure side leading edge cavity 103 is the area surrounded by the leading edge partition rib 90a on the leading edge 42 side and the pressure side leading edge partition rib 90d on the trailing edge 43 side. The pressure side leading edge cavity 103 is divided into a first pressure side leading edge area 65a where the cooling holes 120 are arranged, and a second pressure side leading edge second area 65b where the cooling holes 120 are not arrayed. The second pressure side leading edge area 65b is a range that at least includes an area from a position of the leading edge end surface 71a in the leading edge end portion 71 to a position where the blade body leading edge partition rib 49a is extended in a direction of the pressure side end portion 74 and is connected to the leading edge end portion 71 or the pressure side end portion 74. The first pressure side leading edge area 65*a* is an area disposed adjacent to the axially downstream side of the second pressure side leading edge area 65*b* and extending to the pressure side leading edge partition rib 90*d*.

As shown in FIG. 6, in the first pressure side leading edge area 65*a*, a plurality of cooling hole rows 121 (131, 132) are formed which are formed from the plurality of cooling holes 120 and are arrayed parallel to the pressure side leading edge partition rib 90*d* at predetermined intervals. As shown in a detailed B section of FIGS. 6 and 7, the cooling holes 120 formed in the bottom plate 82 each have an inlet opening 122 opening to the inner surface 83 and an outlet opening 123 opening to the gas path surface 84. The outlet opening 123 is disposed between the position of the trailing edge 43 and the position of the inlet opening 122. Herein, a line that connects the center of the inlet opening 122 and the center of the outlet opening 123 of each of the plurality of cooling holes 120 forming the cooling hole row 121 is called a cooling hole center line FL, and is indicated by a solid line. A line that connects the centers of the outlet openings 123 of the cooling holes 120 adjacent to each other in an extension direction of the pressure side leading edge partition rib 90*d* is called a first opening center line OL1, and is indicated by a dotted line. Further, a line that connects the centers of the inlet openings 122 of the cooling holes 120 adjacent to each other in the extension direction of the pressure side leading edge partition rib 90*d* is called a second opening center line OL2, and is indicated by a dotted line. The cooling hole row 121 has an opening center line OL consisting of the first opening center line OL1 and the second opening center line OL2. The cooling hole center lines FL of the plurality of cooling holes 120 forming the cooling hole row 121 are arrayed in parallel with each other while maintaining the same predetermined interval. The outlet openings 123 of the plurality of cooling holes 120 arranged adjacent to each other in the circumferential direction are arranged such that the first opening center line OL1 and the center line of the pressure side leading edge partition rib 90*d* are parallel. The cooling hole center lines FL of the plurality of cooling hole rows 121 are disposed substantially parallel to the chord direction line CL connecting the leading edge 42 and the trailing edge 43, and are disposed from the blade surface 41 on the pressure surface 45 side to the pressure side end portion 74 or the leading edge end portion 71. Further, the opening center line OL (the first opening center line OL1, the second opening center line OL2) of the cooling hole row 121 is substantially orthogonal to the chord direction line CL. The lengths of the cooling hole center lines FL of the inlet openings 122 and the outlet openings 123 are desirably the same if the thickness of the bottom plate 82 is the same. This is because if the length of the cooling hole 120 is non-uniform, a pressure loss of the cooling air flowing through the cooling hole 120 is non-uniform, resulting in the non-uniform cooling air amount.

Herein, the cooling hole row 121 in the present embodiment is formed as an aggregate of the plurality of cooling holes 120. That is, the cooling hole row 121 in the present embodiment is composed of a group of the plurality of cooling holes 120 arranged at the predetermined intervals from the position of the blade surface 41 on the pressure surface 45 side of the blade body 40 toward the leading edge end portion 71 or the pressure side end portion 74. The cooling hole row 121 (131, 132, 133, 134, 135, 136, 137, 138) is arranged as the aggregate of the plurality of cooling holes 120 in a region from the pressure side leading edge cavity 103 on the leading edge 42 side on the pressure surface 45 side of the shroud 60 to the pressure side trailing edge cavity 107 on the trailing edge 43 side. As described above, the cooling hole row 121 includes the opening center line OL which consists of the linear first opening center line OL1 formed by connecting the centers of the outlet openings 123 of the plurality of cooling holes 120 adjacent in the circumferential direction, and the linear second opening center line OL2 formed by connecting the inlet openings 122 of the cooling holes 120 of the same cooling hole row 121. The first opening center line OL1 and the second opening center line OL2 of the plurality of cooling holes 120 forming the same cooling hole row 121 are desirably disposed so as to be parallel to each other. Therefore, the inlet openings 122 and the outlet openings 123 of the cooling holes 120 forming the same cooling hole row 121 are arranged to be disposed linearly in a direction from the blade surface 41 side to the leading edge end portion 71 side or the pressure side end portion 74 side. The plurality of cooling hole rows 121 arranged from the leading edge 42 side to the trailing edge 43 side are desirably disposed such that the group of the plurality of cooling holes 120 forming each cooling hole row 121 extends in the circumferential direction, the plurality of cooling hole rows 121 extending in the leading edge-trailing edge direction are disposed at the predetermined intervals in the leading edge-trailing edge direction, and the opening center lines OL of the respective cooling hole rows 121 are parallel to each other. Further, it is desirable that inclination of the opening center line OL consisting of the first opening center line OL1 or the second opening center line OL2 of each cooling hole row 121 with respect to the cooling hole center line FL is maintained at the same inclination. With such configuration, since the cooling air discharged from the cooling holes 120 to the combustion gas flow passage 47 is discharged along a combustion gas flow flowing through the gas path surface 84 on the pressure surface 45 side of the shroud 60, the flow of the combustion gas is not disturbed, which is advantageous in terms of aerodynamic performance. In some of the plurality of cooling holes 120 forming the same cooling hole row 121, due to a partial difference in thickness of the bottom plate 82 or a difference in inclination of the cooling hole 120 associated with the degree of difficulty of hole machining, the second opening center line OL2 of the inlet openings 122 cannot linearly be disposed in some cases even if the first opening center line OL1 of the outlet openings 123 can linearly be disposed. In such a case, a linear center line determined by the positions of not less than half of the inlet openings 122 may be selected as the second opening center line OL2. Even in such a case, the first opening center line OL1 and the second opening center line OL2 of the cooling holes 120 are desirably parallel to each other.

As shown in FIGS. 4 and 6, the first impingement plate 110*a* is disposed in the pressure side leading edge cavity 103, and the inner cavity 109 is formed between the first impingement plate 110*a* and the bottom plate 82. The cooling hole row 121 including the plurality of cooling holes 120 described above is formed in the bottom plate 82. Further, the pressure side leading edge partition rib 90*d* disposed between the first intermediate cavity 106*a* adjacent to the trailing edge 43 side of the pressure side leading edge cavity 103 is formed with the cooling hole row 121 (133) where the plurality of cooling holes 120 are arrayed. The cooling hole row 121 (133) is arranged from the blade surface 41 on the pressure surface 45 side to the pressure side end portion 74. As shown in a detailed C section of FIGS. 6 and 7, the inlet opening 122 and the outlet opening 123 of the cooling hole 120 are disposed such that a cross section extending from the bottom plate 82 to the outer side (opposite flow passage side) includes the projecting partition rib 90 between the inlet opening 122 and the outlet opening 123. The inlet opening 122 is formed in the bottom plate 82 on the leading edge 42 side of the partition rib 90, and the outlet opening 123 is formed in the bottom plate 82 on the trailing edge 43 side of the partition rib 90. The cooling hole center line FL of cooling hole 120 is disposed in a direction orthogonal to an extension direction of the partition rib 90. The opening center line OL of cooling hole 120 is disposed parallel to the extension direction of the partition rib 90. The inlet opening 122 opens to the pressure side leading edge cavity 103, and the outlet opening 123 opens to the gas path surface 84 on the first intermediate cavity 106*a* side. The inlet opening 122 may be formed in a side surface 91 of the partition rib 90 on the leading edge 42 side. The cooling holes 120 are formed in the bottom plate 82 so as to cross the partition rib 90 in plane cross-sectional view, convectively cooling the partition rib 90 and the bottom plate 82 in the vicinity of the partition rib 90. The first impingement plate 110*a* is disposed at the mounting height h1 from the inner surface 83 of the bottom plate 82, and has the plurality of through holes 111 with the hole diameter d1 and the array pitch L1.

No cooling holes 120 are arranged in the second pressure side leading edge area 65*b* of the pressure side leading edge cavity 103 shown in FIG. 6. The second pressure side leading edge area 65*b* is disposed in the pressure side leading edge region 65 of the shroud 60, but due to the inflow of leaked air from the axially upstream side of the leading edge end portion 71, the combustion gas temperature in the second pressure side leading edge area 65*b* is lower than that in another region of the shroud 60 on the leading edge 42 side. Therefore, the cooling of the second pressure side leading edge area 65*b* can suppress overheating of the bottom plate 82 only with impingement cooling (impingement) by the cooling air supplied from the through holes 111 of the impingement plate 110 in the pressure side leading edge cavity 103, and the second pressure side leading edge area 65*b* is an area that does not need to be cooled by the cooling holes 120.

Figure 7:
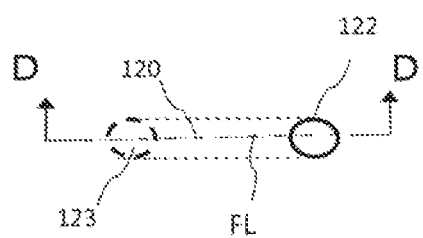
FIG. 7 shows cross-sectional views of a B section and a C section in FIG. 6.
Figure 7:
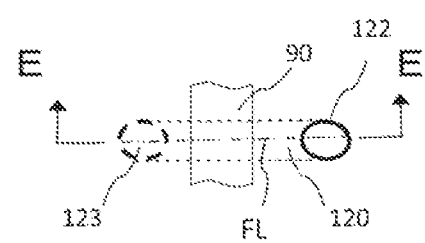
Figure 7:
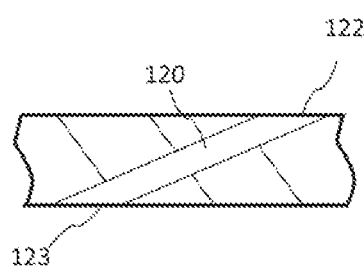
Figure 7:
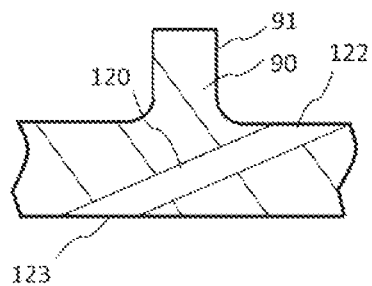

As shown in FIGS. 4 and 6, the first intermediate cavity 106*a* constituting part of the pressure side intermediate cavity 106 is an area surrounded by the pressure side leading edge partition rib 90*d* on the leading edge 42 side and the first intermediate partition rib 90*e1* on the trailing edge 43 side. The pressure side leading edge partition rib 90*d* and the first intermediate partition rib 90*e1* are disposed on the leading edge 42 side and the trailing edge 43 side, with a position where the blade body trailing edge partition rib 49*c* is extended in the pressure side end portion 74 direction being interposed between the pressure side leading edge partition rib 90*d* and the first intermediate partition rib 90*e1*. As with the first pressure side leading edge area 65*a* of the pressure side leading edge cavity 103, in the first intermediate cavity 106*a*, the plurality of cooling holes 120 are arranged in parallel with the pressure side leading edge partition rib 90*d* and the cooling hole rows 121 (134) arrayed at the predetermined intervals are formed. The structure of the cooling hole 120 and the concept of the cooling hole center line FL and the opening center line OL shown in the detailed B section of FIG. 7 are also applicable to the cooling hole 120 of the first intermediate cavity 106*a*. The cooling hole row 121 is formed from the plurality of cooling holes 120 arrayed at the predetermined intervals in the direction orthogonal to the chord direction line CL, and is disposed from the blade body end portion 40*a* on the pressure surface 45 side to the pressure side end portion 74.

As shown in FIG. 4, the fourth impingement plate 110*d* is disposed in the first intermediate cavity 106*a*, and the inner cavity 109 is formed between the fourth impingement plate 110*d* and the bottom plate 82. The cooling hole row 121 including the plurality of cooling holes 120 described above is formed in the bottom plate 82 of the inner cavity 109. The cooling hole row 121 is arranged from the blade body end portion 40*a* on the pressure surface 45 side to the pressure side end portion 74. The fourth impingement plate 110*d* is disposed at the mounting height h2 from the inner surface 83 of the bottom plate 82, and has the plurality of through holes 111 with the hole diameter d2 and the array pitch L2.

As shown in FIG. 6, the second intermediate cavity 106*b* is an area disposed adjacent to the trailing edge 43 side of the first intermediate cavity 106*a* and surrounded by the first intermediate partition rib 90*e1* on the leading edge 42 side and the second intermediate partition rib 90*e2* on the trailing edge 43 side.

As with the first intermediate cavity 106*a*, in the second intermediate cavity 106*b*, the plurality of cooling holes 120 are arranged in parallel with the first intermediate partition rib 90*e1* and the cooling hole rows 121 (135) are formed which are arrayed at the predetermined intervals and composed of the cooling holes. The structure of the cooling hole 120 and the concept of the cooling hole center line FL and the opening center line OL shown in the detailed B section of FIG. 7 are also applicable to the cooling hole 120 of the second intermediate cavity 106*b*. The cooling hole row 121 is arrayed in the direction orthogonal to the chord direction line CL, and is arranged from the blade body end portion 40*a* on the pressure surface 45 side to the pressure side end portion 74.

As shown in FIG. 4, the fifth impingement plate 110*e* is disposed in the second intermediate cavity 106*b*, and the inner cavity 109 is formed between the fifth impingement plate 110*e* and the bottom plate 82. The cooling hole row 121 including the plurality of cooling holes 120 described above is formed in the bottom plate 82 of the inner cavity 109. The cooling hole row 121 is arranged from the blade body end portion 40*a* on the pressure surface 45 side to the pressure side end portion 74. The fifth impingement plate 110*e* is disposed at the mounting height h2 from the inner surface 83 of the bottom plate 82, and has the plurality of through holes 111 with the hole diameter d2 and the array pitch L3.

As shown in FIG. 6, the third intermediate cavity 106*c* is an area disposed adjacent to the trailing edge 43 side of the second intermediate cavity 106*b* and surrounded by the second intermediate partition rib 90*e2* on the leading edge 42 side and the third intermediate partition rib 90*e3* on the trailing edge 43 side.

As with the second intermediate cavity 106*b*, in the third intermediate cavity 106*c*, the cooling holes 120 are arranged in parallel with the second intermediate partition rib 90*e2* and the cooling hole rows 121 (136) are formed which are arrayed at the predetermined intervals and composed of the plurality of cooling holes 120. The structure of the cooling hole 120 and the concept of the cooling hole center line FL and the opening center line OL shown in the detailed B section of FIG. 7 are also applicable to the cooling hole 120 of the third intermediate cavity 106*c*. The cooling hole row 121 is arrayed in the direction orthogonal to the chord direction line CL, and is arranged from the blade body end portion 40a on the pressure surface 45 side to the pressure side end portion 74.

As shown in FIG. 4, the sixth impingement plate 110f is disposed in the third intermediate cavity 106c, and the inner cavity 109 is formed between the sixth impingement plate 110f and the bottom plate 82. The cooling hole row 121 including the plurality of cooling holes 120 described above is formed in the bottom plate 82 of the inner cavity 109. The cooling hole row 121 is arranged from the blade body end portion 40a on the pressure surface 45 side to the pressure side end portion 74. The sixth impingement plate 110f is disposed at the mounting height h2 from the inner surface 83 of the bottom plate 82, and has the plurality of through holes 111 with the hole diameter d2 and the array pitch L4.

As shown in FIG. 6, the pressure side trailing edge cavity 107 is disposed adjacent to the trailing edge 43 side of the third intermediate cavity 106c, and is disposed between the third intermediate partition rib 90e3 on the leading edge 42 side and the trailing edge 43 of the blade body 40. As with the third intermediate cavity 106c, in pressure side trailing edge cavity 107, the plurality of cooling holes 120 are arranged in parallel with the third intermediate partition rib 90e3 and the cooling hole rows 121 (137, 138) are formed which are arrayed at the predetermined intervals and composed of the cooling holes 120. The structure of the cooling hole 120 and the concept of the cooling hole center line FL and the opening center line OL shown in the detailed B section of FIG. 7 are also applicable to the cooling hole 120 of the pressure side trailing edge cavity 107. The plurality of cooling hole rows 121 are arrayed in the direction orthogonal to the chord direction line CL, and are arranged from the blade body end portion 40a on the pressure surface 45 side to the pressure side end portion 74.

As shown in FIG. 4, the seventh impingement plate 110g is disposed in the pressure side trailing edge cavity 107, and the inner cavity 109 is formed between the seventh impingement plate 110g and the bottom plate 82. The cooling hole row 121 including the plurality of cooling holes 120 described above is formed in the bottom plate 82 of the inner cavity 109. The seventh impingement plate 110g is disposed at the mounting height h2 from the inner surface 83 of the bottom plate 82, and has the plurality of through holes 111 with the hole diameter d2 and the array pitch L5.

In the impingement plate 110 of the present embodiment, in terms of the mounting height of the impingement plate 110, the mounting height h1 of the impingement plate 110a in the pressure side leading edge cavity 103 is higher than the mounting height h2 of the impingement plate 110 (the fourth impingement plate 110d, the fifth impingement plate 110e, the sixth impingement plate 110f, the seventh impingement plate 110g) in the pressure side intermediate cavity 106 (the first intermediate cavity 106a, the second intermediate cavity 106b, the third intermediate cavity 106c, the pressure side trailing edge cavity 107).

In terms of the hole diameter d of the through hole 111 formed in the impingement plate 110, the hole diameter d2 of the through hole 111 of the impingement plate 110 (the fourth impingement plate 110d, the fifth impingement plate 110e, the sixth impingement plate 110f, the seventh impingement plate 110g) in the pressure side intermediate cavity 106 (the first intermediate cavity 106a, the second intermediate cavity 106b, the third intermediate cavity 106c, the pressure side trailing edge cavity 107) is smaller than the hole diameter d1 of the through hole 111 of the first impingement plate 110a in the pressure side leading edge cavity 103 (d1>d2).

In terms of the array pitch L of the through hole 111 formed in the impingement plate 110, relative to the array pitch L1 of the through hole 111 of the first impingement plate 110a in the pressure side leading edge cavity 103, the array pitch L of the through hole 111 of the impingement plate 110 (the fourth impingement plate 110d, the fifth impingement plate 110e, the sixth impingement plate 110f, the seventh impingement plate 110g) in the pressure side intermediate cavity 106 (the first intermediate cavity 106a, the second intermediate cavity 106b, the third intermediate cavity 106c, the pressure side trailing edge cavity 107) is such that the through hole 111 of the fourth impingement plate 110d has the array pitch L2, the through hole 111 of the fifth impingement plate 110e has the array pitch L3, the through hole 111 of the sixth impingement plate 110f has the array pitch L4, and the through hole 111 of the seventh impingement plate 110g has the array pitch L5, and all of the array pitches are smaller than the array pitch L1 of the through hole 111 of the first impingement plate 110a in the pressure side leading edge cavity 103. However, in the aspect shown in FIG. 4, the array pitch L of the impingement plate 110 (the fourth impingement plate 110d, the fifth impingement plate 110e, the sixth impingement plate 110f, the seventh impingement plate 110g) in the pressure side intermediate cavity 106 (the first intermediate cavity 106a, the second intermediate cavity 106b, the third intermediate cavity 106c, the pressure side trailing edge cavity 107) is smaller than the array pitch L1 of the through hole 111 of the impingement plate 110 in any of the other cavities 100. Further, the array pitch L2 of the through hole 111 of the fourth impingement plate 110d is smaller than the array pitch L3 of the through hole 111 of the fifth impingement plate 110e (L2<L3). The array pitch L3 of the through hole 111 of the fifth impingement plate 110e is smaller than the array pitch L4 of the through hole 111 of the sixth impingement plate 110f (L3<L4). The array pitch L5 of the through hole 111 of the seventh impingement plate 110g is smaller than the array pitch L4 of the through hole 111 of the sixth impingement plate 110f (L4<L5). That is, comparing the size of the array pitch L of the through hole 111 of the pressure side intermediate cavity 106 in the present embodiment, the array pitch L of the through hole 111 from the axially downstream side toward the axially upstream side can be displayed as L5>L4>L3>L2.

<<Pressure Distribution of Combustion Gas Flow>>

Figure 8:
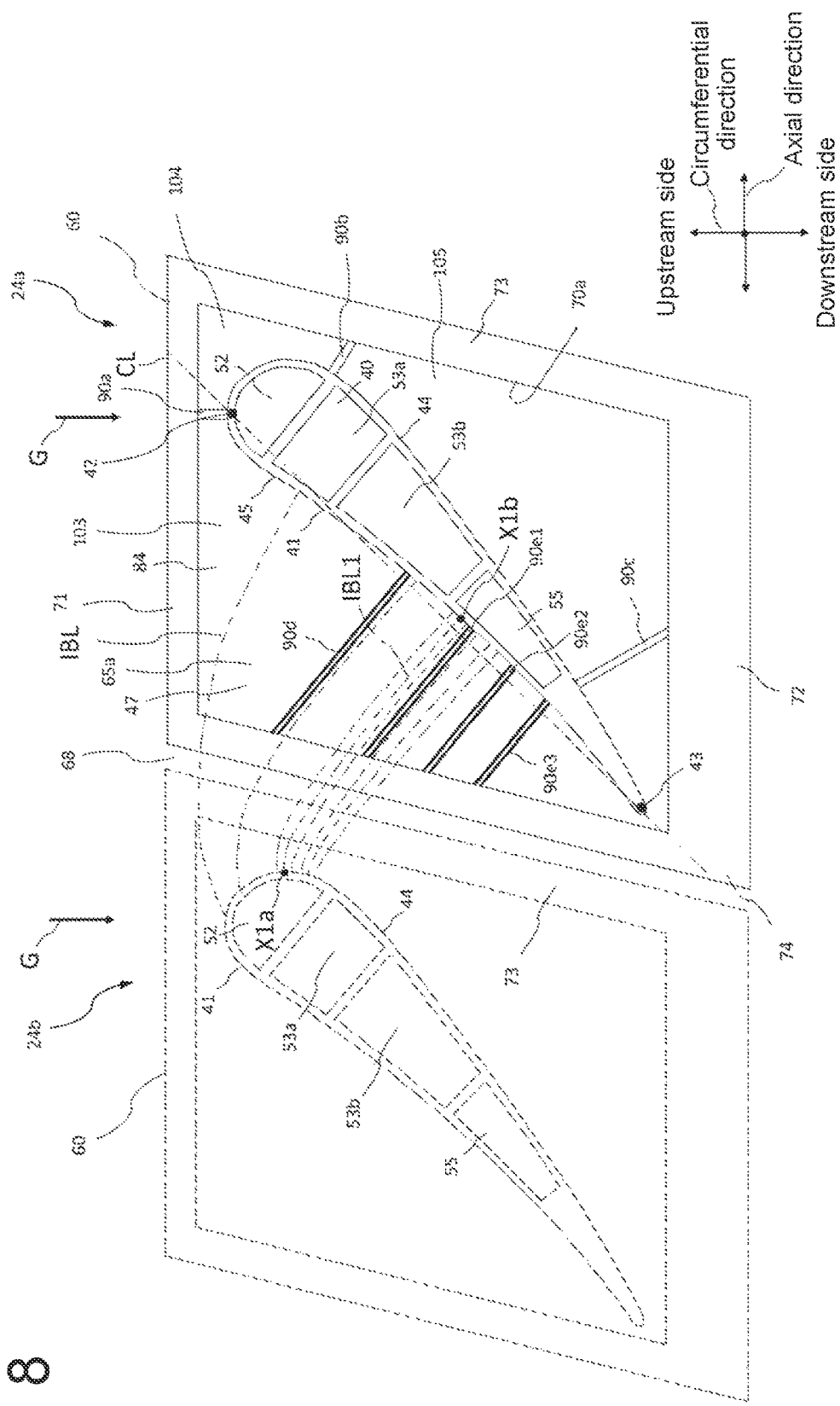
FIG. 8 is a view showing a pressure distribution of a combustion gas flow around the turbine stationary blade.

By taking as an example the combustion gas flow passage 47 which is formed between the two turbine stationary blades 24a and 24b disposed adjacent to each other in the circumferential direction, FIG. 8 is a view of a partial pressure distribution of the combustion gas G when the combustion gas G flows along the gas path surface 84 of the shroud 60 in combustion gas flow passage 47 as viewed from the blade height direction. Constant pressure lines IBL of a pressure distribution of a gas pressure (static pressure) of the flow of the combustion gas G are indicated by chain lines. To give an example of the constant pressure lines IBL of the turbine stationary blade 24, a constant pressure line 1BL1 having a gas pressure (static pressure) GP at a position of a starting point X1a on the blade surface 41 on the leading edge 42 side of the turbine stationary blade 24b side is indicated by a chain line up to an end point X1b on the blade surface 41 on the pressure surface 45 side of the turbine stationary blade 24a adjacent in the circumferential direction, and the same gas pressure (static pressure) GP is maintained at any positions along IBL1. As shown in FIG. 8, among the constant pressure lines ILB, the constant pressure line IBL starting from the blade surface 41 on the suction surface 44 side in contact with the blade body leading edge air passage 52 on the leading edge 42 side of the turbine stationary blade 24b and the blade surface 41 on the suction surface 44 side in contact with the first intermediate air passage 53 is disposed in a range from a region where the first pressure side leading edge area 65a in the pressure side leading edge cavity 103 of the shroud 60 on the pressure surface 45 side of the turbine stationary blade 24a adjacent in the circumferential direction is disposed to the trailing edge 43 of the blade body 40. The constant pressure line IBL in this region is formed so as to substantially be orthogonal to the chord direction line CL of the blade body 40 of the turbine stationary blade 24a. As described above, the partition rib 90 disposed on the pressure surface 45 side of the turbine stationary blade 24a (the pressure side leading edge partition rib (RB1) 90d, the first intermediate partition rib (RB2) 90e1, the second intermediate partition rib (RB3) 90e2, and the third intermediate partition rib (RB4) 90e3) are substantially orthogonal to the chord direction line CL. That is, the cooling hole center line FL of the cooling holes 120 disposed in the cavity 100 on the pressure surface 45 side of the blade body 40 (the pressure side leading edge cavity 103, the pressure side intermediate cavity 106) is substantially orthogonal to a direction in which the partition rib 90 extends from the blade body end portion 40a to the pressure side end portion 74, and the opening center line OL of the cooling holes 120 is formed along the gas path surface 84 in parallel with the extension direction of the partition rib 90. The pressure distribution of the combustion gas flow indicated by the chain lines in FIG. 8 shows some of the constant pressure lines, and the constant pressure line IBL on the blade surface 41 side of the pressure surface 45 side in the range from the vicinity of the position of the pressure side leading edge partition rib 90d of the turbine stationary blade 24a to the vicinity of the trailing edge 43 of the blade body 40 forms pressure distributions that are substantially parallel to each other, and the constant pressure lines IBL in the vicinity of the respective partition ribs 90 of the pressure side leading edge partition rib 90d and the intermediate partition rib 90e are formed substantially parallel to the extension direction of the partition rib 90.

As described above, the reason why the cooling hole center line FL of the cooling hole row 121 is orthogonal to the extension direction of the partition rib 90 is that the flow direction of the combustion gas G is a direction substantially orthogonal to the constant pressure line ILB in the region flowing through the combustion gas flow passage 47 between the blades, and the amount of the cooling air flowing through each cooling hole 120 is easily uniformized by making the cooling hole center line FL orthogonal to the partition rib 90. Further, disposing the opening center line OL of the cooling holes 120 in parallel with the extension direction of the partition rib 90 means the same as disposing the center position of each outlet opening 123 opening to the gas path surface 84 of the cooling hole 120 on the constant pressure line ILB of the same pressure. Therefore, the pressures in the outlet openings 123 become the same by disposing the positions of the outlet openings 123 of the cooling holes 120 in the cooling hole row 121 on the constant pressure line IBL, which has effects that a fluctuation in the combustion gas pressure (static pressure) GP at the outlet openings 123 is reduced to suppress an influence on an internal pressure on the inner cavity 109 side and to suppress a fluctuation in internal pressure of the inner cavity 109. As a result, the amount of the cooling air flowing through the respective cooling holes 120 of the same cooling hole row 121 is uniformized, a temperature distribution of a metal temperature in the bottom plate 82 is uniformized, and a thermal stress generated in the bottom plate 82 is reduced.

Figure 9:
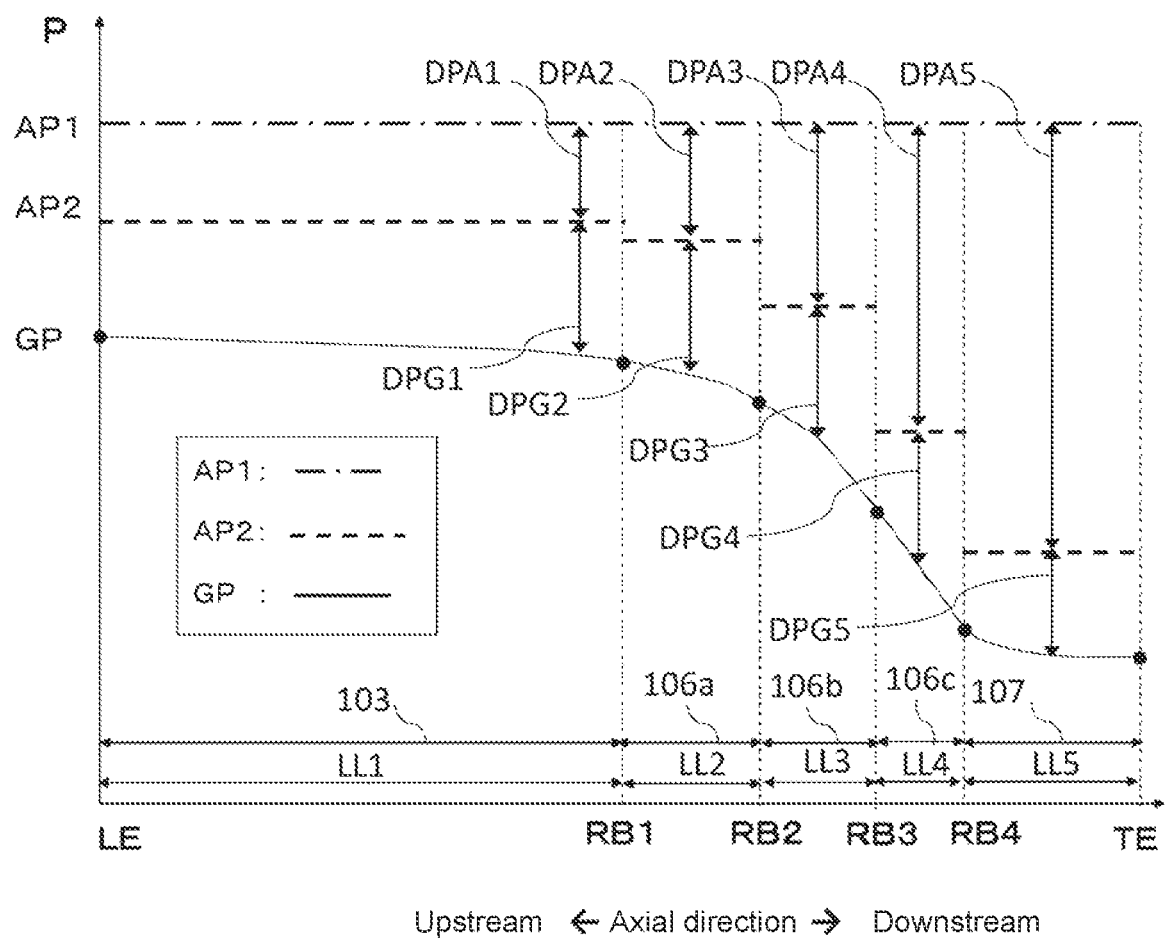
FIG. 9 is a graph showing pressure changes of cooling air and the combustion gas flow in a cavity on a pressure side of the shroud.

The pressure GP of the combustion gas G gradually decreases toward a downstream direction of the combustion gas G. In FIG. 9, the vertical axis indicates the pressure (static pressure) P of the cooling air or the combustion gas G, and the horizontal axis indicates an axial position of the combustion gas flow passage 47. In the horizontal axis, a reference sign at a left end indicates a position of the leading edge (LE) 42 of the blade body 40, and a reference sign at a right end indicates a position of the trailing edge (TE) 43 of the blade body 40. Further, as to the positions of the partition ribs 90 disposed on the shroud 60 side between the leading edge 42 and the trailing edge 43, positions of the pressure side leading edge partition rib 90d, the first intermediate partition rib 90e1, the second intermediate partition rib 90e2, and the third intermediate partition rib 90e3 are indicated by RB1, RB2, RB3, RB4 from axially the upstream side toward the axially downstream side. Furthermore, AP1 denotes an internal pressure in the outer cavity 108 supplied with the cooling air, and AP2 denotes an internal pressure of the cooling air in the inner cavity 109 after the cooling air has passed through the through hole 111 of the impingement plate 110.

As shown in FIG. 9, the combustion gas pressure GP decreases as the combustion gas G flows down from the leading edge (LE) 42 to the trailing edge (TE) 43. In particular, the pressure greatly decreases in the combustion gas flow passage 47 from a position in the vicinity of the pressure side leading edge partition rib 90d (RB1), which is an intermediate position from the leading edge 42 to the trailing edge 43 of the blade surface 41 of the blade body 40, to the trailing edge 43. On the other hand, as to the cooling air discharged from the cooling hole 120, an air amount of film-cooling cooling air discharged from the cooling hole 120 varies due to a differential pressure DPG between a pressure AP2 on the inner cavity 109 side where the inlet opening 122 of the cooling hole 120 is formed and the pressure GP of the combustion gas G when the cooling air is discharged to the combustion gas flow passage 47 side via the outlet opening 123. The cooling air amount increases if the differential pressure DPG is high, and the cooling air amount decreases if the differential pressure DPG is low. The differential pressure DPG determined by the internal pressure AP2 on the inner cavity 109 side and the pressure GP on the gas path surface 84 side is desirably kept as constant as possible. By maintaining the same cooling air amount even for the cooling holes 120 of any of the cooling hole rows 121 formed in the gas path surface 84 of the shroud 60, drift or variation in the cooling air amount due to the difference in position of the cooling holes 120 is suppressed, the metal temperature distribution of the bottom plate 82 is uniformized, and the occurrence of thermal stress is suppressed. Therefore, from this point of view, it is desirable that the cooling holes 120 of each cooling hole row 121 maintain the same differential pressure DPG.

In the present embodiment, as shown in FIG. 9, the pressure side leading edge partition rib (RB1) 90d is disposed at a position where the pressure (static pressure) GP of the combustion gas G starts to decrease, and the intermediate partition rib 90e (the first intermediate partition rib 90e1, the second intermediate partition rib 90e2, the third intermediate partition rib 90e3) is disposed from the pressure side intermediate region 67 to the trailing edge 43 of the blade body 40, where the pressure GP of the combustion gas G greatly decreases, thereby forming the pressure side intermediate cavity 106 (the first intermediate cavity 106a, the second intermediate cavity 106b, the third intermediate cavity 106c, the pressure side trailing edge cavity 107). In the present embodiment, as the pressure side intermediate partition ribs 90e, three partition ribs 90 are disposed and four pressure side intermediate cavities 106 are disposed. However, two partition ribs 90 may be disposed and three pressure side intermediate cavities 106 may be disposed. Alternatively, at least four partition ribs 90 may be disposed and at least five pressure side intermediate cavities 106 may be disposed.

In particular, from the viewpoint of reducing the cooling air amount, the differential pressure DPG between the internal pressure AP2 on the inner cavity 109 side of each cavity 100 and the pressure GP of the combustion gas G on the gas path surface 84 side is desirably constant in the first pressure side leading edge area 65a of the pressure side leading edge cavity 103 and the area of the pressure side intermediate cavity 106. Since the pressure GP of the combustion gas G decreases toward the axially downstream side, it is desirable that the pressure side intermediate cavity 106 is subdivided in the axial direction to increase a pressure loss of the cooling air in the through hole 111 of the impingement plate 110 in each cavity 100 and to decrease the internal pressure AP2 in the inner cavity 109 little by little along the decrease in the pressure GP of the combustion gas G, unless there are structural restrictions.

As shown in FIG. 9, in the present embodiment, in the pressure side leading edge cavity 103, DPA1 denotes a differential pressure between the pressure AP1 in the outer cavity 108 and the internal pressure AP2 in the inner cavity 109, and DPG1 denotes a differential pressure between the internal pressure AP2 in the inner cavity 109 and the pressure GP of the combustion gas G on the gas path surface 84. In the first intermediate cavity 106a, DPA2 denotes a differential pressure between the pressure AP1 in the outer cavity 108 and the internal pressure AP2 in the inner cavity 109, and DPG2 denotes a differential pressure between the internal pressure AP2 in the inner cavity 109 and the pressure GP of the combustion gas G. In the second intermediate cavity 106b, DPA3 denotes a differential pressure between the pressure AP1 in the outer cavity 108 and the internal pressure AP2 in the inner cavity 109, and DPG3 denotes a differential pressure between the internal pressure AP2 in the inner cavity 109 and the pressure GP of the combustion gas G. In the third intermediate cavity 106c, DPA4 denotes a differential pressure between the pressure AP1 in the outer cavity 108 and the internal pressure AP2 in the inner cavity 109, and DPG4 denotes a differential pressure between the internal pressure P2 in the inner cavity 109 and the pressure GP of the combustion gas G.

In the pressure side trailing edge cavity 107, DPA5 denotes a differential pressure between the pressure AP1 in the outer cavity 108 and the internal pressure AP2 in the inner cavity 109, and DPG5 denotes a differential pressure between the internal pressure AP2 in the inner cavity 109 and the pressure GP of the combustion gas G.

As described above, the differential pressure DPG between the internal pressure AP2 on the inner cavity 109 side of the cooling hole 120 and the pressure GP of the combustion gas G on the gas path surface 84 side desirably has the constant value. Therefore, the differential pressures DPG1, DPG2, DPG3, DPG4, and DPG5 between the pressure GP on the combustion gas G side and the inner cavities 109 of the pressure side leading edge cavity 103 and the pressure side intermediate cavity 106 desirably have the same value as much as possible.

The pressure AP1 in the outer cavity 108 supplied with cooling air is a constant pressure on an entire surface of the shroud 60 from the leading edge 42 to the trailing edge 43 of the shroud 60. Meanwhile, in the combustion gas flow passage 47, the pressure GP of the combustion gas G decreases from the axially upstream side toward the axially downstream side. In order to make the differential pressure DPG between the inner cavity 109 and the combustion gas pressure GP constant in accordance with the process of decreasing the pressure GP of the combustion gas G, the internal pressure in the inner cavity 109 needs to be decreased toward the axially downstream side. It is desirable to adjust the hole specification of the through hole 111 in the impingement plate 110 such that the differential pressure DPA between the outer shroud 108 and the inner cavity 109 increases in accordance with the decrease in the combustion gas pressure GP. That is, under the condition that the hole diameter d of the through hole 111 is the same, the number of through holes 111 can be reduced by increasing the array pitch L of the through holes 111 in the impingement plate 110, toward the axially downstream side. Consequently, the pressure loss in the cooling air passing through one through hole 111 is increased, making it possible to decrease the internal pressure in the inner cavity 109. Alternatively, if the hole diameter d is different depending on the cavity 100, the hole specification may be selected such that the opening density (d/L), which is determined by the array pitch L and the hole diameter d of the through hole 111, decreases toward the axially downstream side. That is, the hole specification can be selected such that the opening density (d/L) of the through holes 111 of the impingement plate 110 in the respective cavities 100 of the pressure side intermediate cavity 106 (the first intermediate cavity 106a, the second intermediate cavity 106b, the third intermediate cavity 106c, the pressure side trailing edge cavity 107) is lower in the cavity 100 on the trailing edge 43 side than in the cavity 100 on the leading edge 42 side. As a result, the internal pressure AP2 in the inner cavity 109 decreases in accordance with the decrease in the combustion gas pressure GP, and the differential pressure between the inlet opening 122 and the outlet opening 123 of the cooling hole 120 is maintained at the constant differential pressure DPG (DPG1 to DPG 5), suppressing excessive outflow of the cooling air.

Further, as in the aspect shown in FIG. 9, it is desirable that in the turbine stationary blade 24 where the combustion gas pressure GP starts to decrease as the combustion gas G passes through the position of the pressure side leading edge partition rib (RB1) 90d and rapidly decreases until the third intermediate partition rib (RB4) 90e3, the change in the combustion gas pressure GP in the axial direction reduces the interval of the partition ribs 90 of the pressure side intermediate partition rib 90e (the first intermediate partition rib 90e1, the second intermediate partition rib 90e2, the third intermediate partition rib 90e3) in the axial direction (leading edge-trailing edge direction) toward the axially downstream side. As shown in FIG. 6, letting LL1 be an axial interval between the leading edge partition rib 90a (the position of the leading edge 42) and the pressure side leading edge partition rib (RB1) 90d, LL2 be an axial interval between the pressure side leading edge partition rib (RB1) 90d and the first intermediate partition rib (RB2) 90e1, LL3 be an axial interval between the first intermediate partition rib (RB2) 90e1 and the second intermediate partition rib (RB3) 90e2, LL4 be an axial interval between the second intermediate partition rib (RB3) 90e2 and the third intermediate partition rib (RB4) 90e3, and LL5 be an axial interval between the third intermediate partition rib (RB4) 90e3 and the trailing edge 43 of the blade body 40, it is desirable that the interval LL between the partition ribs 90 is decreased toward the axially downstream side until the third intermediate partition rib (RB4) 90e3 (LL1>LL2>LL3>LL4). In the region of the pressure side leading edge cavity 103 sandwiched between the leading edge partition rib 90a and the pressure side leading edge partition rib (RB1) 90d, the decrease in the combustion gas pressure GP is small. Therefore, the axial interval LL1 of this region is larger than the axial interval LL2 between the pressure side leading edge partition rib (RB1) 90d and the first intermediate partition rib (RB2) 90e1. On the other hand, the decrease in the combustion gas pressure GP is smaller in the pressure side trailing edge cavity 107 of the region from the third intermediate partition rib (RB4) 90e3 to the trailing edge 43 of the blade body 40 than in the other pressure side intermediate cavities 106 on the axially upstream side, and the axial interval LL5 is larger than the axial intervals (LL2, LL3, LL4) of the other pressure side intermediate cavities 106 and smaller than the axial interval LL1 of the pressure side leading edge cavity 103.

Herein, the axial width LL means an axial width along the chord direction line CL of the blade body 40.

Comparing the pressure side leading edge cavity 103 and the pressure side intermediate cavity 106, the axial interval LL1 of the pressure side leading edge cavity 103 is the largest. The axial interval LL5 of the pressure side trailing edge cavity 107 is smaller than the axial interval of the pressure side leading edge cavity and larger than any of the axial intervals of the first intermediate cavity 106a to the third intermediate cavity 106c on axially upstream side. That is, the individual axial width LL of the plurality of intermediate cavities 106a, 106b, 106c disposed between the pressure side leading edge cavity 103 and the pressure side trailing edge cavity 107 is smaller than the axial width of the pressure side trailing edge cavity 107. Further, the axial width LL2 of the first intermediate cavity 106a is larger than the axial width LL3 of the second intermediate cavity 106b, and the axial width LL3 of the second intermediate cavity 106b is larger than the axial width LL4 of the third intermediate cavity 106c.

By applying such structure, even in the region of the combustion gas flow passage 47 where the combustion gas pressure GP rapidly decreases, the differential pressure DPG of the cooling holes 120 arranged in the shroud 60 is properly controlled to optimize the pressure in each cavity, making it possible to suppress excessive loss of the cooling air amount for film cooling.

The arrangement of the cooling hole rows 121 in FIG. 6 and the above description is merely an example, and the present disclosure is not limited to this example as long as the technical idea of the present embodiment is satisfied.

Third Embodiment

The procedure of a cooling method for the pressure side intermediate cavity 106 of the turbine stationary blade 24 described in the above-described second embodiment will be described with reference to FIG. 10.

As shown in FIG. 10, the cooling method for the cavity 100 on the pressure surface 45 side (the pressure side leading edge cavity 103, the pressure side intermediate cavity 106) of the blade body 40 of the turbine stationary blade 24 includes a step S1 of supplying cooling air to the outer cavity 108 of the shroud 60, a step S2 of decompressing the cooling air with the through hole 111 of the impingement plate 110 and supplying the cooling air to the inner cavity 109, a step S3 of impingement-cooling the bottom plate 82 with the cooling air, and a step S4 of film-cooling the bottom plate 82 with the cooling air.

The step S1 of supplying the cooling air to the outer cavity 108 of the shroud 60 includes supplying the cooling air to the shroud 60 from the turbine casing 22 or the external casing 20 of the turbine stationary blade 24 (S1).

The step S2 of decompressing the cooling air with the impingement plate 110 includes decompressing the cooling air in the process of discharging the cooling air to the inner cavity 109 via the plurality of through holes 111 formed in the impingement plate 110 (S2). As described above, the pressure side intermediate cavities 106 are constituted by the plurality of intermediate cavities (the first intermediate cavity 106a, the second intermediate cavity 106b, the third intermediate cavity 106c, the pressure side trailing edge cavity 107) and are arrayed from the axially upstream side to the axially downstream side. In any of the intermediate cavities 100, the cooling air is decompressed with the through holes 111 of the impingement plate 110 when the cooling air passes through the through holes 111, and the internal pressure AP2 in the inner cavity 109 is lower than the pressure AP1 in the outer cavity 108. However, as shown in FIG. 9, the combustion gas pressure GP flowing through the combustion gas flow passage 47 on the gas path surface 84 side of the bottom plate 82 formed with the pressure side intermediate cavity 106 rapidly decreases from the axially upstream side toward the axially downstream side. In order to maintain the constant differential pressure DPG (the pressure difference between the internal pressure AP2 in the inner cavity 109 and the combustion gas pressure GP) in the cooling holes 120 formed in the bottom plate 82, it is necessary to decrease the internal pressure AP2 in the inner cavity 109 to be about the internal pressure in the pressure side intermediate cavity 106 on the axially downstream side. Therefore, the pressure side intermediate cavity 106 on the axially downstream side has the lower opening density (d/L) of the through holes 111 in the impingement plate 110 such that the internal pressure AP2 in the inner cavity 109 is decreased and the differential pressure DPG in the cooling holes 120 is maintained constant.

The step S3 of impingement-cooling the bottom plate 82 with the cooling air includes causing the cooling air ejected into the inner cavity 109 from the through hole 111 of the impingement plate 110 to impinge on the inner surface 83 of the bottom plate 82 to impingement-cool the inner surface 83 (S3). The internal pressure AP2 in the inner cavity 109 is lower in the pressure side intermediate cavity 106 disposed axially downstream than in the pressure side intermediate cavity 106 disposed axially upstream, and the internal pressure in the pressure side intermediate cavity 106 decreases toward the axially downstream side.

The step S4 of film-cooling the bottom plate 82 with the cooling air includes supplying the cooling air having impingement-cooled the inner surface 83 of the bottom plate 82 to the plurality of cooling holes 120 and film-cooling the gas path surface 84 of the shroud 60 when the cooling air is discharged to the combustion gas flow passage 47 (S4). As described above, the opening center line OL of the cooling hole rows 121 of the plurality of cooling holes 120 are disposed in parallel along the constant pressure line IBL of the combustion gas G, and the differential pressure DPG of the cooling holes 120 of the plurality of intermediate cavities arrayed toward the axially downstream side is maintained constant.

According to the cooling method for the turbine stationary blade 24 of the present embodiment, the pressure side intermediate cavity 106 on the axially downstream side has the lower opening density (d/L) of the through holes 111 in the impingement plate 110 such that the cavity 100 on the axially downstream side has the lower internal pressure AP2 in the inner cavity 109. Further, the opening center line OL of the cooling hole rows 121 of the plurality of cooling holes 120 formed in the bottom plate 82 is disposed in parallel along the constant pressure line IBL of the combustion gas G to stabilize the internal pressure fluctuation in the inner cavity 109. Therefore, the differential pressure DPG of the cooling holes 120 of the cooling hole row 121 in the pressure side intermediate cavity 106 can be maintained constant toward the axially downstream side, suppressing that the excess amount of the cooling air is discharged from the cooling holes 120 and making it possible to reduce the cooling air amount. Further, the amount of the cooling air discharged from the cooling holes 120 of the cooling hole row 121 is uniformized, the metal temperature distribution of the bottom plate 82 is uniformized, and the occurrence of the thermal stress is suppressed.

It is intended, however, that unless particularly identified, dimensions, materials, shapes, relative positions and the like of constituent components described as the embodiments or shown in the drawings shall be interpreted as illustrative only and not intended to limit the scope of the present invention. For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function. For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved. On the other hand, the expressions "comprising", "including", "having", "containing", and "constituting" one constituent component are not exclusive expressions that exclude the presence of other constituent components.

The contents described in the above embodiments would be understood as follows, for instance.

(1) A turbine stationary blade according to the first aspect is a turbine stationary blade that includes: a blade body; and a shroud formed in an end portion of the blade body in a blade height direction. The shroud includes: a bottom plate in contact with a combustion gas flow passage; a peripheral wall formed in the blade height direction and along a peripheral edge of the bottom plate; a recess forming a space surrounded by the peripheral wall and the bottom plate; a plurality of partition ribs connecting the blade body and the peripheral wall, dividing the recess into a plurality of spaces, and forming a plurality of cavities; and an impingement plate dividing the space into an outer cavity formed on an outer side in the blade height direction and an inner cavity formed on an inner side of the outer cavity, and having a plurality of through holes via which the outer cavity and the inner cavity communicate with each other. The peripheral wall includes: a leading edge end portion extending to a leading edge side of the blade body; a suction side end portion extending from a leading edge to a trailing edge on a suction side of the blade body, and internally including a suction side passage; a pressure side end portion extending from a leading edge to a trailing edge on a pressure side of the blade body, and internally including a pressure side passage; and a trailing edge end portion extending to a trailing edge side of the blade body. The plurality of cavities are formed from the inner cavity, and include: a first cavity disposed on a leading edge pressure side so as to surround a circumference of the blade body between the blade body and the peripheral wall, connected to the cooling hole formed in the bottom plate, and connected to the pressure side passage; and a second cavity disposed adjacent to an axially downstream side of the first cavity, disposed on a most axially upstream side of the pressure side among the partition ribs, disposed via a first partition rib connecting the pressure side end portion and the pressure surface of the blade body, and having a plurality of cooling holes in the bottom plate. The cooling holes of the first cavity and the second cavity form a plurality of cooling hole rows consisting of a plurality of the cooling holes whose first ends are connected to inlet openings formed in the bottom plate and second ends are connected to outlet openings formed in a gas path surface of the bottom plate. The cooling hole rows include an opening center line which consists of a linear first opening center line connecting the outlet openings of the cooling holes, and a linear second opening center line disposed in parallel to the first opening center line and connecting the inlet openings of the cooling holes. The first opening center line is disposed in parallel to the first partition rib. An opening density of the through holes of the impingement plate in the second cavity is lower than the opening density of the through holes of the impingement plate in the first cavity.

With the gas turbine stationary blade described in the above (1), the first cavity is connected to the pressure side passage. The cooling air required to cool the first cavity is supplied from the outer cavity to the first cavity (inner cavity) via the through holes of the impingement plate, film-cools the bottom plate when the cooling air is discharged from the cooling hole formed in the bottom plate after impingement-cooling the inner surface of the bottom plate, and the bottom plate of the first cavity is cooled by the combination of impingement cooling and film cooling. Further, the first cavity is supplied with the cooling air for cooling the pressure side passage. Therefore, in addition to the cooling air for cooling the first cavity itself, the first cavity is additionally supplied with the cooling air for cooling the pressure side passage.

On the other hand, the second cavity is supplied with only the cooling air for performing film cooling when discharged from the cooling hole after impingement-cooling the bottom plate in the second cavity.

Therefore, compared to the first cavity supplied with the excess cooling air, the second cavity decreases the opening density of the through holes in the impingement plate, reducing the amount of the cooling air supplied to the shroud. That is, the partition ribs dividing the shroud are disposed to form multi-cavity of the shroud, the structure is optimized according to the purpose of each cavity of the shroud, and the amount of the cooling air supplied to the shroud is to be reduced.

Further, the plurality of cooling holes formed in the first cavity and the second cavity form the plurality of cooling hole rows that have the opening center line which consists of the first opening center line connecting the outlet openings of the cooling holes and the second opening center line connecting the inlet openings of the cooling holes. The first opening center line and the second opening center line of the cooling hole rows are disposed parallel to each other and disposed parallel to the first partition rib. The first partition rib is disposed parallel to the constant pressure line of combustion gas, stabilizing the internal pressure in each cavity, and uniformizing the amount of the cooling air discharged from the cooling hole rows formed in each cavity. Further, since the opening density of the impingement plate in the second cavity on the axially downstream side is lower than in the first cavity, the pressure of the second cavity is further reduced than that of the first cavity. Therefore, the differential pressure between the film holes of the cooling hole rows arranged in the first cavity and the second cavity is maintained constant even if the pressure of the combustion gas flowing through the gas path surface decreases toward the axially downstream side, suppressing that the excess cooling air is discharged from the cooling hole rows of the first cavity and the second cavity, stabilizing and optimizing the amount of the cooling air discharged from the cooling hole row of each cavity, and reducing the cooling air amount.

(2) A turbine stationary blade according to the second aspect is a turbine stationary blade that includes: a blade body; and a shroud formed in an end portion of the blade body in a blade height direction. The shroud includes: a bottom plate in contact with a combustion gas flow passage; a peripheral wall formed in the blade height direction and along a peripheral edge of the bottom plate; a recess forming a space surrounded by the peripheral wall and the bottom plate; a plurality of partition ribs connecting the blade body and the peripheral wall, dividing the recess into a plurality of spaces, and forming a plurality of cavities; and an impingement plate dividing the space into an outer cavity formed on an outer side in the blade height direction and an inner cavity formed on an inner side of the outer cavity, and having a plurality of through holes via which the outer cavity and the inner cavity communicate with each other. The peripheral wall includes: a leading edge end portion extending to a leading edge side of the blade body; a suction side end portion extending from a leading edge to a trailing edge on a suction side of the blade body, and internally including a suction side passage; a pressure side end portion extending from a leading edge to a trailing edge on a pressure side of the blade body, and internally including a pressure side passage; and a trailing edge end portion extending to a trailing edge side of the blade body. The plurality of cavities are formed from the inner cavity, and include: a first cavity disposed on a leading edge pressure side so as to surround a circumference of the blade body between the blade body and the peripheral wall, connected to a cooling hole formed in the bottom plate, and connected to the pressure side passage; and a second cavity disposed adjacent to an axially downstream side of the first cavity, disposed on a most axially upstream side of the pressure side among the partition ribs, disposed via a first partition rib connecting the pressure side end portion and the pressure surface of the blade body, and having a plurality of cooling holes in the bottom plate. An opening density of the through holes of the impingement plate in the second cavity is lower than the opening density of the through holes of the impingement plate in the first cavity. The second cavity includes a plurality of intermediate cavities which are divided by a second partition rib constituted by a plurality of intermediate partition ribs connecting the pressure side end portion and the pressure surface of the blade body, and are disposed along the pressure surface of the blade body from an axially upstream side toward the axially downstream side. The opening density of the through holes of the impingement plate in the intermediate cavities decreases toward the axially downstream side, and is lower in the intermediate cavities disposed axially downstream via the intermediate partition ribs than in the intermediate cavities on the axially upstream side.

With the gas turbine stationary blade described in the above (2), in the vicinity of the intermediate cavity where the pressure drop of the combustion gas flowing through the gas path surface on the shroud pressure side is large, the opening density of the through holes of the impingement plate in the intermediate cavity is gradually decreased toward the axially downstream side to decrease the internal pressure in the inner shroud, and the differential pressure between the film cooling holes is made constant from the axially upstream side to the axially downstream side, making it possible to uniformize the amount of the cooling air discharged from the film cooling holes. As a result, it is possible to properly cool the bottom plate of the shroud of the turbine stationary blade and to reduce the cooling air amount.

(3) A turbine stationary blade according to the third aspect is the turbine stationary blade of either (1) or (2), wherein a plurality of cooling holes have the same length of cooling hole center lines connecting the inlet openings and the outlet openings, and form a plurality of cooling rows which are arranged in parallel with each other at predetermined intervals from the pressure side of the blade body toward the suction side end portion or the leading edge end portion.

With the gas turbine stationary blade described in the above (3), since the plurality of cooling holes have the same length of the cooling hole center lines connecting the inlet openings and the outlet openings, and are arranged in parallel with each other at the predetermined intervals from the pressure side of the blade body toward the suction side end portion or the leading edge end portion, it is easy to uniformize the amount of the cooling air discharged from the cooling holes.

(4) A turbine stationary blade according to the fourth aspect is the turbine stationary blade of either (1) or (3), wherein the second cavity is formed from: a plurality of intermediate cavities which are divided by a second partition rib disposed axially downstream of the first partition rib and constituted by a plurality of intermediate partition ribs connecting the pressure side end portion and the pressure surface of the blade body, and are disposed along the pressure surface of the blade body from an axially upstream side toward the axially downstream side; and a pressure side trailing edge cavity disposed adjacent to the axially downstream side of the intermediate cavities, and disposed between the trailing edge of the blade body and the second partition rib forming the intermediate cavities and located on a most downstream side, and, wherein the opening density of the through holes of the impingement plate in the second cavity decreases toward the axially downstream side.

With the gas turbine stationary blade described in the above (4), since the second cavity is divided into the plurality of cavities disposed along the blade body by the intermediate partition ribs disposed parallel to the first partition rib and the cavity on the axially downstream side has the lower opening density of the through holes of the impingement plate in the plurality of cavities, it is possible to increase, toward the downstream side, the pressure loss of the cooling air passing through the through holes, to decrease the internal pressure in each inner cavity in accordance with the decrease in pressure of the combustion gas flow, to uniformize the amount of the cooling air discharged from the cooling holes of each cooling hole row by making the differential pressure between the inlet opening and the outlet opening of the cooling holes of the cooling hole row constant, to reduce the thermal stress of the bottom plate, and to reduce the cooling air amount.

(5) A turbine stationary blade according to the fifth aspect is the turbine stationary blade of any one of (1) or (3) or (4), wherein a second partition rib which is constituted by a plurality of intermediate partition ribs connecting the pressure side end portion and the pressure surface of the blade body is constituted by at least two intermediate partition ribs, wherein a position where the first partition rib joins the blade body is within a range where a blade body intermediate air passage of the blade body is formed, and wherein a position where the second partition rib joins the blade body is disposed in a range from an intermediate position of a range where a blade body trailing edge air passage is formed to the trailing edge of the blade body.

With the gas turbine stationary blade described in the above (5), since the position where the intermediate partition rib forming the second partition rib joins the blade body is disposed in the range from the intermediate position of the range in which the blade body trailing edge cavity is formed to the trailing edge, the shroud cavity section in the region where the pressure decrease in the combustion gas flow passage flowing along the blade body is large is subdivided, the amount of the cooling air discharged from the cooling hole is optimized, making it possible to reduce the cooling air amount.

(6) A turbine stationary blade according to the sixth aspect is the turbine stationary blade of any one of (1) to (5), wherein the first cavity is formed between the first partition rib and a third partition rib connecting the leading edge end portion and the leading edge of the blade body, wherein the second cavity is formed from: a plurality of intermediate cavities divided along a blade surface by the second partition rib; and a pressure side trailing edge cavity disposed adjacent to the axially downstream side of the intermediate cavities, and formed between the trailing edge of the blade body and the second partition rib on a most axially downstream side, wherein an axial width of the first cavity and the second cavity along a chord direction line of the blade body is the largest in the first cavity, and smaller in the pressure side trailing edge cavity than in the first cavity, and wherein the axial width of an individual cavity among the plurality of intermediate cavities disposed between the first cavity and the pressure side trailing edge cavity is smaller than the axial width of the pressure side trailing edge cavity.

With the gas turbine stationary blade described in the above (6), the static pressure of the combustion gas flow flowing along the blade body rapidly decreases from the blade body intermediate portion toward the trailing edge. Therefore, by making the axial width of the first cavity having the smallest pressure decrease in the combustion gas flow larger than the axial width of each of the second cavities, and by making the axial width of the pressure side trailing edge cavity having the smaller pressure decrease than the intermediate cavity smaller than the axial width of the first cavity and larger than the axial width of each of the intermediate cavities, the axial width of the intermediate cavity where the pressure of the combustion gas flow rapidly decreases is reduced to keep the internal pressure fluctuation in the inner cavity per one intermediate cavity small, making it possible to suppress the fluctuation in the amount of the cooling air discharged from the cooling holes of the cooling hole row.

(7) A turbine stationary blade according to the seventh aspect is the turbine stationary blade of any one of (1) to (6), wherein the axial width of an individual cavity among the intermediate cavities of the second cavity decreases toward the axially downstream side.

With the gas turbine stationary blade described in the above (7), by decreasing the axial width of the intermediate cavity of the second cavity toward the axially downstream side, the pressure of the inner cavity of the intermediate cavity on the axially downstream side, where the pressure of the combustion gas flow greatly decreases is increased, as well as the pressure fluctuation of the inner cavity is kept small, suppressing the discharge of the amount of the cooling air discharged from the cooling holes on the axially downstream side and reducing the cooling air amount.

(8) A turbine stationary blade according to the eighth aspect is the turbine stationary blade of any one of (1) to (7), wherein the first partition rib includes the cooling hole row consisting of the plurality of cooling holes which join the inlet openings formed on an inner surface side of the bottom plate on a leading edge side of the first partition rib and the outlet openings formed on a gas path surface side of the bottom plate on a trailing edge side of the first partition rib.

With the gas turbine stationary blade described in the above (8), the cooling holes are arranged in the first partition rib, suppressing thermal damage to the first partition rib where the metal temperature is high.

(9) A turbine stationary blade according to the ninth aspect is the turbine stationary blade of any one of (1) to (8), wherein the first cavity includes a first pressure side leading edge area where the cooling holes are arranged, and a second pressure side leading edge area where the cooling holes are not arrayed, wherein the second pressure side leading edge area at least includes an area of a range from a position of a leading edge end surface in the leading edge end portion to a position where a blade body leading edge partition rib is extended in a direction of the pressure side end portion or the leading edge end portion and is connected to the leading edge end portion or the pressure side end portion, and wherein the first pressure side leading edge area is disposed adjacent to the axially downstream side of the second pressure side leading edge area.

With the gas turbine stationary blade described in the above (9), in the second pressure side leading edge area, overheating of the gas path surface is suppressed by the inflow of leaked air from the leading edge end surface side of the shroud. Therefore, the amount of the cooling air supplied to the first cavity is reduced by providing the first cavity with the second pressure side leading edge area without any cooling holes.

(10) A turbine stationary blade according to the tenth aspect is the turbine stationary blade of (1), wherein the plurality of cavities include: a third cavity disposed on a leading edge suction side so as to surround a circumference of the blade body between the blade body and the peripheral wall, connected to the cooling hole formed in the bottom plate, and connected to the suction side passage; and a fourth cavity disposed adjacent to the axially downstream side of the third cavity, disposed via a fourth partition rib connecting the suction side end portion and a suction surface of the blade body, and connected to a blade body intermediate air passage, and wherein an opening density of the through holes of the impingement plate in the second cavity is lower than the opening density of the through holes of the impingement plate in the third cavity and the fourth cavity.

With the gas turbine stationary blade described in the above (10), the first cavity, the third cavity, and the fourth cavity are connected to the suction side passage and the blade body intermediate air passage. The cooling air required to cool the first cavity, the third cavity, and the fourth cavity is supplied from the outer cavity to the inner cavity via the through holes of the impingement plate, and film-cools the bottom plate when the cooling air is discharged from the cooling hole formed in the bottom plate after impingement-cooling the inner surface of the bottom plate. The bottom plate of the leading edge side cavity is cooled by the combination of impingement cooling and film cooling or by impingement cooling alone.

Further, the first cavity, the third cavity, and the fourth cavity are supplied with the cooling air for cooling the suction side passage and the blade body. Therefore, in addition to the cooling air for cooling the third cavity and the fourth cavity themselves, the first cavity, the third cavity, and the fourth cavity are supplied with excess cooling air in order to cool the pressure side passage, the suction side passage, and the blade body. On the other hand, the second cavity is supplied with only the cooling air for performing film cooling when discharged from the cooling hole formed in the bottom plate after impingement-cooling the bottom plate of the second cavity.

Therefore, compared to the first cavity, the third cavity, and the fourth cavity supplied with the excess cooling air, the second cavity which is supplied with only the cooling air amount required to cool itself relatively decreases the opening density of the through holes, making it possible to reduce the cooling air amount.

(11) A turbine stationary blade according to the eleventh aspect is the turbine stationary blade of any one of (1) to (10), wherein the shroud includes: an outer shroud disposed on the outer side of the blade body in the blade height direction; and an inner shroud disposed on the inner side of the blade body in the blade height direction.

(12) A turbine according to the twelfth aspect, includes: the turbine stationary blade including (1) to (11); and a combustor for producing a combustion gas flowing through a combustion gas flow passage disposed in the turbine stationary blade.

With the gas turbine described in the above (12), since the stationary blade is provided which is formed with the appropriate cooling structure for the shroud composed of the multi-cavity, the cooling air amount is reduced, and the efficiency of the gas turbine is improved.

(13) A cooling method for a turbine stationary blade according to the thirteenth aspect is a cooling method for a turbine stationary blade including: a blade body; and a shroud formed in an end portion of the blade body in a blade height direction, the shroud including: a bottom plate in contact with a combustion gas flow passage; a peripheral wall formed in the blade height direction and along a peripheral edge of the bottom plate; a recess forming a space surrounded by the peripheral wall and the bottom plate; a plurality of partition ribs connecting the blade body and the peripheral wall, dividing the recess into a plurality of spaces, and forming a plurality of cavities; and an impingement plate dividing the space into an outer cavity formed on an outer side in the blade height direction and an inner cavity formed on an inner side of the outer cavity, and having a plurality of through holes via which the outer cavity and the inner cavity communicate with each other, the plurality of cavities formed from the inner cavity, and disposed along a pressure side blade surface of the blade body and adjacent to each other in tandem in an axially downstream direction, the impingement plate having the through holes whose opening density decreases toward the axially downstream side, the turbine stationary blade including a cooling hole row which has a plurality of cooling holes communicating with the inner cavity via inlet openings formed in an inner surface of the bottom plate and communicating with a combustion gas flow passage via outlet openings formed in a gas path surface of the bottom plate, the cooling method for the turbine stationary blade, that includes: a step of externally supplying cooling air to the outer cavity; a step of reducing a pressure of the cooling air, where the cooling air is supplied from the outer cavity to the inner cavity via the through holes formed in the impingement plate disposed in the plurality of cavities, an internal pressure of the cavities decreases toward the axially downstream side, and a differential pressure between the inner cavity and the combustion gas flow passage is maintained constant; a step of impingement-cooling an inner surface of the bottom plate with the cooling air; and a step of film-cooling the gas path surface when the cooling air after the impingement cooling is discharged from the cooling holes formed in the bottom plate to the combustion gas flow passage.

With the cooling method for the turbine stationary blade described in the above (13), it is formed such that the opening density of the through holes in the impingement plate disposed in the cavity of the shroud is lower in the cavity toward the axially downstream direction, and the pressure loss of the cooling air in the through hole is increased to maintain the constant pressure difference between the inlet opening and the outlet opening of the cooling hole. Therefore, the cooling air supplied to the cavity increases the pressure loss in the impingement plate from the leading edge toward the trailing edge, and the pressure in the inner cavity decreases toward the axially downstream side. As a result, the amount of the cooling air discharged from the cooling holes is uniformized between the cavities in the flow direction of the combustion gas G, the discharge of the excess cooling air from the cavity on the axially downstream side is suppressed, and the cooling air amount is reduced.

(14) A cooling method for a turbine stationary blade according to the fourteenth aspect is the cooling method for the turbine stationary blade of (13), wherein, in the step of film-cooling the gas path surface, the cooling holes are arranged such that an opening center line of the outlet openings is parallel to a constant pressure line of a combustion gas flow flowing through the gas path surface, and a fluctuation in the internal pressure of the inner cavity is suppressed.

With the cooling method for the turbine stationary blade described in the above (14), since the opening center line connecting the outlet openings of the cooling holes forming the cooling hole row is disposed parallel to the constant pressure line of the combustion gas flow, the pressure at the outlet openings where the cooling air is disposed is maintained at the same pressure, the internal pressure fluctuation of the inner cavity connected to the upstream side of the cooling hole is suppressed, the amount of the cooling air discharged from the cooling hole is stabilized, and the cooling air amount is reduced.

(15) A cooling method for a turbine stationary blade according to the fifteenth aspect is the cooling method for the turbine stationary blade of (13) or (14), wherein the plurality of cavities are a first cavity disposed on a leading edge pressure side of the blade body and are disposed adjacent to the axially downstream side of the first cavity.

(16) A cooling method for a turbine stationary blade according to the sixteenth aspect is the cooling method for the turbine stationary blade of any one of (13) to (15), wherein the shroud includes: an outer shroud disposed on the outer side of the blade body in the blade height direction; and an inner shroud disposed on the inner side of the blade body in the blade height direction.

REFERENCE SIGNS LIST

1 Gas turbine
2 Compressor
4 Combustor
6 Turbine
8 Rotor
10 Compressor casing
12 Intake chamber
14 Inlet guide blade
16 Compressor stationary blade
18 Compressor rotor blade
20 Casing
22 Turbine casing
24, 24a, 24b Turbine stationary blade
26 Turbine rotor blade
28 Exhaust casing
29 Exhaust hood
40 Blade body
40a Blade body end portion
40b Blade wall
41 Blade surface
42 Leading edge (LE)
42a Leading edge region
43 Trailing edge (TE)
44 Suction surface
45 Pressure surface
46 Fillet portion
47 Combustion gas flow passage
49 Blade body partition rib (blade body leading edge partition rib 49a, blade body intermediate partition rib 49b, blade body trailing edge partition rib 49c)
51 Blade body air passage
52 Blade body leading edge air passage
53 Blade body intermediate air passage
53a First blade body intermediate air passage
53b Second blade body intermediate air passage
55 Blade body trailing edge air passage
56 Lid
56a Opening
60 Shroud (outer shroud 60a, inner shroud 60b)
61 Leading edge portion
62 Trailing edge portion
64 Suction side leading edge region
65 Pressure side leading edge region
65a First pressure side leading edge area
65b Second pressure side leading edge area
66 Suction side intermediate region
67 Pressure side intermediate region
68 Gap
70 Peripheral wall
70a Inner wall
71 Leading edge end portion
71a Leading edge end surface
72 Trailing edge end portion
72a Opening
73 Suction side end portion
74 Pressure side end portion
77 Suction side passage
77a Upstream end
78 Pressure side passage
78a Upstream end
82 Base plate
83 Inner surface
84 Gas path surface (outer surface)
90 Partition rib
90a Leading edge partition rib (third partition rib)
90b Suction side leading edge partition rib (fourth partition rib)
90c Suction side trailing edge partition rib
90d Pressure side leading edge partition rib (first partition rib, RB1)
90e Intermediate partition rib (second partition rib)
90e1 First intermediate partition rib (RB2)
90e2 Second intermediate partition rib (RB3)
90e3 Third intermediate partition rib (RB4)
91 Rib wall surface
93 Recess
94 Hook
100 Cavity
101 Multi-cavity (collection of plurality of cavities 100)
103 Pressure side leading edge cavity (first cavity)
104 Suction side leading edge cavity (third cavity)
105 Suction side intermediate cavity (fourth cavity)
106 Pressure side intermediate cavity (second cavity)
106a First intermediate cavity (second cavity)
106b Second intermediate cavity (second cavity)
106c Third intermediate cavity (second cavity)
107 Pressure side trailing edge cavity (second cavity)
108 Outer cavity
109 Inner cavity
110 Impingement plate
110a First impingement plate
110b Second impingement plate
110c Third impingement plate
110d Fourth impingement plate
110e Fifth impingement plate
110f Sixth impingement plate
110g Seventh impingement plate
111 Through hole
120 Cooling hole
121, 131, 132, 133, 134, 135, 136, 137, 138 Cooling hole row
122 Inlet opening
123 Outlet opening
124 Suction side trailing edge cavity
G Combustion gas
CL Chord direction line
FL Cooling hole center line
OL Opening center line
OL1 First opening center line
OL2 Second opening center line
L, L1, L2, L3, L4, L5 Array pitch
LL, LL1, LL2, LL3, LL4, LL5 Interval
IBL, IBL1 Constant pressure line
X1a Starting point
X1b End point
DPA, DPA1, DPA2, DPA3, DPA4, DPA5 Differential pressure (through hole)
DPG, DPG1, DPG2, DPG3, DPG4, DPG5 Differential pressure (cooling hole)
AP1 Outer cavity pressure
AP2 Inner cavity internal pressure
GP Combustion gas pressure
h Mounting height

The invention claimed is:

1. A turbine stationary blade, comprising:
a blade body; and
a shroud formed in an end portion of the blade body in a blade height direction,
wherein the shroud includes:
a bottom plate in contact with a combustion gas flow passage;
a peripheral wall formed in the blade height direction and along a peripheral edge of the bottom plate;
a recess forming a space surrounded by the peripheral wall and the bottom plate;
a plurality of partition ribs connecting the blade body and the peripheral wall, dividing the recess into a plurality of cavities; and
an impingement plate dividing each cavity into an outer cavity formed on an outer side in the blade height direction and an inner cavity formed on an inner side of the outer cavity, and having a plurality of through holes via which the outer cavity and the inner cavity communicate with each other,
wherein the peripheral wall includes:
a leading edge end portion extending to a leading edge side of the blade body;
a suction side end portion extending from a leading edge to a trailing edge on a suction side of the blade body, and internally including a suction side passage;
a pressure side end portion extending from a leading edge to a trailing edge on a pressure side of the blade body, and internally including a pressure side passage; and
a trailing edge end portion extending to a trailing edge side of the blade body,
wherein the plurality of cavities are formed from the inner cavity, and include:
a first cavity disposed on a leading edge pressure side of the blade body so as to surround a circumference of the blade body between the blade body and the peripheral wall, connected to a cooling hole formed in the bottom plate, and connected to the pressure side passage; and
a second cavity disposed adjacent to an axially downstream side of the first cavity, the second cavity being disposed on an axially downstream side of a plurality of sides of the pressure side of the blade body among the partition ribs, disposed via a first partition rib connecting the pressure side end portion of the peripheral wall and a pressure surface of the blade body, and having a plurality of cooling holes in the bottom plate,
wherein the cooling holes of the first cavity and the second cavity form a plurality of cooling hole rows consisting of a plurality of the cooling holes, each cooling hole having a first end and a second end, whose first ends are connected to respective inlet openings formed in the bottom plate and second ends are connected to respective outlet openings formed in a gas path surface of the bottom plate,
wherein the cooling hole rows include an opening center line which consists of a linear first opening center line connecting the outlet openings of the cooling holes, and a linear second opening center line disposed in parallel to the first opening center line and connecting the inlet openings of the cooling holes,
wherein the first opening center line is disposed in parallel to the first partition rib,
wherein an opening density of the through holes of the impingement plate in the second cavity is lower than the opening density of the through holes of the impingement plate in the first cavity, and
wherein the first partition rib includes a cooling hole row consisting of the plurality of cooling holes which join the inlet openings formed on an inner surface side of the bottom plate on a leading edge side of the first partition rib and the outlet openings formed on a gas path surface side of the bottom plate on a trailing edge side of the first partition rib.

2. The turbine stationary blade according to claim 1, wherein a plurality of cooling holes have the same length of cooling hole center lines connecting the inlet openings and the outlet openings, and are arranged in parallel with each other at predetermined intervals from the pressure side of the blade body toward the suction side end portion or the leading edge end portion.

3. The turbine stationary blade according to claim 1, wherein the second cavity is formed from:
a plurality of intermediate cavities which are divided by a second partition rib constituted by a plurality of intermediate partition ribs connecting the pressure side end portion and the pressure surface of the blade body, and are disposed along the pressure surface of the blade body from an axially upstream side of the plurality of sides toward the axially downstream side of the plurality of sides; and
a pressure side trailing edge cavity disposed adjacent to an axially downstream side of the intermediate cavities, and disposed between the trailing edge of the blade body and the second partition rib forming the intermediate cavities and located on a most downstream side of the plurality of sides, and,
wherein the opening density of the through holes of the impingement plate in the second cavity decreases toward the axially downstream side of the plurality of sides.

4. The turbine stationary blade according to claim 1, wherein a second partition rib is constituted by a plurality of intermediate partition ribs connecting the pressure side end portion of the peripheral wall and the pressure surface of the blade body,
wherein a position where the first partition rib joins the blade body is within a range where a blade body intermediate air passage of the blade body is formed, and
wherein a position where the second partition rib joins the blade body is disposed in a range which extends from the trailing edge of the blade body to an intermediate position of a range where a blade body trailing edge air passage is formed.

5. The turbine stationary blade according to claim 1, wherein the first cavity is formed between the first partition rib and a third partition rib connecting the leading edge end portion and the leading edge of the blade body,
wherein the second cavity is formed from:
a plurality of intermediate cavities divided along a blade surface by a second partition rib; and
a pressure side trailing edge cavity disposed adjacent to an axially downstream side of the intermediate cavities, and formed between the trailing edge of the blade body and the second partition rib on a most axially downstream side,
wherein an axial width of each of the first cavity and the second cavity along a chord direction line of the blade body is
the largest in the first cavity, and
smaller in the pressure side trailing edge cavity than in the first cavity, and wherein the axial width of an individual cavity among the plurality of intermediate cavities disposed between the first cavity and the pressure side trailing edge cavity is smaller than the axial width of the pressure side trailing edge cavity.

6. The turbine stationary blade according to claim 1, wherein the second cavity includes a plurality of intermediate cavities divided along a blade surface by a second partition rib, and
wherein an axial width of an individual cavity among the intermediate cavities of the second cavity decreases toward the axially downstream side.

7. The turbine stationary blade according to claim 1, wherein the first cavity includes a first pressure side leading edge area where the cooling holes are arranged, and a second pressure side leading edge area where the cooling holes are not arranged,
wherein the second pressure side leading edge area at least includes an area of a range from a position of a leading edge end surface in the leading edge end portion to a position where a blade body leading edge partition rib is extended in a direction of the pressure side end portion or the leading edge end portion and is connected to the leading edge end portion or the pressure side end portion, and
wherein the first pressure side leading edge area is disposed adjacent to the axially downstream side of the second pressure side leading edge area.

8. The turbine stationary blade according to claim 1, wherein the plurality of cavities include:
a third cavity disposed on a leading edge suction side so as to surround a circumference of the blade body between the blade body and the peripheral wall, connected to the cooling hole formed in the bottom plate, and connected to the suction side passage; and
a fourth cavity disposed adjacent to the axially downstream side of the third cavity, disposed via a fourth partition rib connecting the suction side end portion of the peripheral wall and a suction surface of the blade body, and connected to a blade body intermediate air passage, and
wherein an opening density of the through holes of the impingement plate in the second cavity is lower than the opening density of the through holes of the impingement plate in the third cavity and the fourth cavity.

9. The turbine stationary blade according to claim 1, wherein the shroud includes: an outer shroud disposed on the outer side of the blade body in the blade height direction; and
an inner shroud disposed on the inner side of the blade body in the blade height direction.

10. A gas turbine, comprising:
the turbine stationary blade according to claim 1; and
a combustor for producing a combustion gas flowing through a combustion gas flow passage disposed with the turbine stationary blade.

11. A turbine stationary blade, comprising:
a blade body; and
a shroud formed in an end portion of the blade body in a blade height direction,
wherein the shroud includes:
a bottom plate in contact with a combustion gas flow passage;
a peripheral wall formed in the blade height direction and along a peripheral edge of the bottom plate;
a recess forming a space surrounded by the peripheral wall and the bottom plate;
a plurality of partition ribs connecting the blade body and the peripheral wall, dividing the recess into a plurality of cavities; and
an impingement plate dividing each cavity into an outer cavity formed on an outer side in the blade height direction and an inner cavity formed on an inner side of the outer cavity, and having a plurality of through holes via which the outer cavity and the inner cavity communicate with each other,
wherein the peripheral wall includes:
a leading edge end portion extending to a leading edge side of the blade body;
a suction side end portion extending from a leading edge to a trailing edge on a suction side of the blade body, and internally including a suction side passage;
a pressure side end portion extending from a leading edge to a trailing edge on a pressure side of the blade body, and internally including a pressure side passage; and
a trailing edge end portion extending to a trailing edge side of the blade body,
wherein the plurality of cavities are formed from the inner cavity, and include:
a first cavity disposed on a leading edge pressure side of the blade body so as to surround a circumference of the blade body between the blade body and the peripheral wall, connected to a cooling hole formed in the bottom plate, and connected to the pressure side passage; and
a second cavity disposed adjacent to an axially downstream side of the first cavity, the second cavity being disposed on an axially downstream side of a plurality of sides of the pressure side of the blade body among the partition ribs, disposed via a first partition rib connecting the pressure side end portion of the peripheral wall and a pressure surface of the blade body, and having a plurality of cooling holes in the bottom plate,
wherein an opening density of the through holes of the impingement plate in the second cavity is lower than the opening density of the through holes of the impingement plate in the first cavity,
wherein the second cavity includes a plurality of intermediate cavities which are divided by a second partition rib constituted by a plurality of intermediate partition ribs connecting the pressure side end portion of the peripheral wall and the pressure surface of the blade body, the plurality of intermediate partition ribs being disposed along the pressure surface of the blade body from an axially upstream side of the plurality of sides of the pressure side toward the axially downstream side of the plurality of sides, and
wherein the opening density of the through holes of the impingement plate in the intermediate cavities decreases toward the axially downstream side, and is lower in the intermediate cavities disposed axially downstream via the intermediate partition ribs than in the intermediate cavities on the axially upstream side of the pressure side of the blade body.

12. A cooling method for a turbine stationary blade including:
a blade body; and
a shroud formed in an end portion of the blade body in a blade height direction,
the shroud including:
a bottom plate in contact with a combustion gas flow passage;

a peripheral wall formed in the blade height direction and along a peripheral edge of the bottom plate;
a recess forming a space surrounded by the peripheral wall and the bottom plate;
a plurality of partition ribs connecting the blade body and the peripheral wall, dividing the recess into a plurality of cavities; and
an impingement plate dividing each cavity into an outer cavity formed on an outer side in the blade height direction and an inner cavity formed on an inner side of the outer cavity, and having a plurality of through holes via which the outer cavity and the inner cavity communicate with each other,
wherein the peripheral wall includes:
a leading edge end portion extending to a leading edge side of the blade body;
a suction side end portion extending from a leading edge to a trailing edge on a suction side of the blade body, and internally including a suction side passage;
a pressure side end portion extending from a leading edge to a trailing edge on a pressure side of the blade body, and internally including a pressure side passage; and
a trailing edge end portion extending to a trailing edge side of the blade body,
wherein the plurality of cavities are formed from the inner cavity, and include:
a first cavity disposed on a leading edge pressure side of the blade body so as to surround a circumference of the blade body between the blade body and the peripheral wall, connected to a cooling hole formed in the bottom plate, and connected to the pressure side passage; and
a second cavity disposed adjacent to an axially downstream side of the first cavity, the second cavity being disposed on an axially downstream side of a plurality of sides of the pressure side of the blade body among the partition ribs, disposed via a first partition rib connecting the pressure side end portion of the peripheral wall and a pressure surface of the blade body, and having a plurality of cooling holes in the bottom plate,
wherein the cooling holes of the first cavity and the second cavity form a plurality of cooling hole rows consisting of a plurality of the cooling holes, each cooling hole having a first end and a second end, whose first ends are connected to respective inlet openings formed in the bottom plate and second ends are connected to respective outlet openings formed in a gas path surface of the bottom plate,
wherein the cooling hole rows include an opening center line which consists of a linear first opening center line connecting the outlet openings of the cooling holes, and a linear second opening center line disposed in parallel to the first opening center line and connecting the inlet openings of the cooling holes,
wherein the first opening center line is disposed in parallel to the first partition rib,
wherein an opening density of the through holes of the impingement plate in the second cavity is lower than the opening density of the through holes of the impingement plate in the first cavity, and
wherein the first partition rib includes a cooling hole row consisting of the plurality of cooling holes which join the inlet openings formed on an inner surface side of the bottom plate on a leading edge side of the first partition rib and the outlet openings formed on a gas path surface side of the bottom plate on a trailing edge side of the first partition rib,
the cooling method for the turbine stationary blade comprising:
externally supplying cooling air to the outer cavity;
reducing a pressure of the cooling air, where the cooling air is supplied from the outer cavity to the inner cavity via the through holes formed in the impingement plate, an internal pressure of the cavities decreases toward the axially downstream side, and a differential pressure between the inner cavity and the combustion gas flow passage is maintained constant;
impingement-cooling an inner surface of the bottom plate with the cooling air; and
film-cooling the gas path surface when the cooling air after the impingement cooling is discharged from the cooling holes formed in the bottom plate to the combustion gas flow passage.

13. The cooling method for the turbine stationary blade according to claim 12,
wherein, in the film-cooling of the gas path surface,
the opening center line of the outlet openings is parallel to a constant pressure line of a combustion gas flow flowing through the gas path surface, and a fluctuation in the internal pressure of the inner cavity is suppressed.

14. The cooling method for the turbine stationary blade according to claim 12,
wherein the shroud includes:
an outer shroud disposed on the outer side of the blade body in the blade height direction; and
an inner shroud disposed on the inner side of the blade body in the blade height direction.

* * * * *